(12) United States Patent
Padulo et al.

(10) Patent No.: US 6,530,811 B1
(45) Date of Patent: Mar. 11, 2003

(54) MODULAR DISTRIBUTION ASSEMBLY

(75) Inventors: Michael Padulo, Kirkland (CA); Imad Ghanem, Dollard des Ormeaux (CA); Denis Mayer, Lachine (CA)

(73) Assignee: Astec International Limited (HK)

( * ) Notice: Subject to any disclaimer, the term of this patent is extended or adjusted under 35 U.S.C. 154(b) by 269 days.

(21) Appl. No.: 09/585,265

(22) Filed: Jun. 2, 2000

Related U.S. Application Data

(63) Continuation-in-part of application No. 09/326,737, filed on Jun. 4, 1999, now Pat. No. 6,315,580.

(51) Int. Cl.⁷ ................................................. H01R 9/26
(52) U.S. Cl. ..................... 439/716; 439/532; 439/82; 361/634; 361/644; 361/648; 361/652
(58) Field of Search .......................... 439/82, 83, 716, 439/709, 715, 532; 361/634, 644, 648, 652

(56) References Cited

U.S. PATENT DOCUMENTS

| | | |
|---|---|---|
| 4,002,388 A | 1/1977 | Menocal |
| 4,138,179 A | 2/1979 | Miller et al. |
| 4,358,810 A | 11/1982 | Wafer et al. |
| 4,371,743 A | 2/1983 | Decker |
| 4,722,701 A | 2/1988 | Bradt |
| 4,796,546 A | 1/1989 | Herbert |
| 4,797,110 A | 1/1989 | Ponziani et al. |
| 4,822,287 A | 4/1989 | Lanchet |
| 4,886,462 A | 12/1989 | Fierro |
| 5,067,043 A | 11/1991 | Markowski et al. |
| 5,125,854 A | 6/1992 | Bassler et al. |
| 5,146,056 A | 9/1992 | Kuczynski |
| 5,184,961 A | 2/1993 | Ramirez et al. |
| 5,214,314 A | 5/1993 | Dillard et al. |
| 5,225,962 A | 7/1993 | Neill et al. |
| 5,355,274 A | 10/1994 | Marach et al. |
| 5,502,286 A | 3/1996 | Pollman et al. |
| 5,513,995 A | 5/1996 | Kurotori et al. |
| 5,515,023 A | 5/1996 | Marach et al. |
| 5,638,225 A | 6/1997 | Bobadilla et al. |
| 5,709,574 A | 1/1998 | Bianca et al. |
| 5,726,852 A | 3/1998 | Trifiletti et al. |
| 5,768,079 A | 6/1998 | Buell |
| 5,796,060 A | 8/1998 | Fuchsle et al. |
| 5,853,305 A | 12/1998 | Bedrossian et al. |
| 5,894,405 A | 4/1999 | Fleege et al. |
| 5,912,801 A | 6/1999 | Roy et al. |
| 5,963,411 A | 10/1999 | Mollet et a. |
| 6,002,580 A | * 12/1999 | LeVantine et al. .......... 361/634 |
| 6,317,311 B1 | * 11/2001 | Middlehurst et al. ....... 361/637 |

* cited by examiner

*Primary Examiner*—Tho D. Ta
(74) *Attorney, Agent, or Firm*—Coudert Brothers LLP

(57) ABSTRACT

An assembly for mechanically mounting and providing electrical connections to overcurrent protection devices having first and second male power plugs includes a non-conductive main structural support member having a plurality of plug passageways formed therein and one or more load busbar modules mounted thereon and also including a plug passageway formed therein, to enable the male electrical plugs to mate with sockets disposed in a conductive line busbar member mounted on said support member and with a socket disposed in a load busbar member included in each load busbar module. Each load busbar module includes a non-conductive housing and a releasable cover within which is mounted the load busbar member. A printed circuit board substrate is preferably also mounted to said support member to provide a support surface for auxiliary signal clip connectors disposed on one side of the substrate. Additional passageways enable auxiliary contact terminals that are preferably also included on each overcurrent protection device to extend through the substrate. Clip connectors disposed on the substrate are used to make electrical contact to the auxiliary terminals. Each set of sockets and clips are shaped and dimensioned to mate with the power plugs and alarm contact terminals of a plug-in circuit breaker or fuse module.

16 Claims, 25 Drawing Sheets

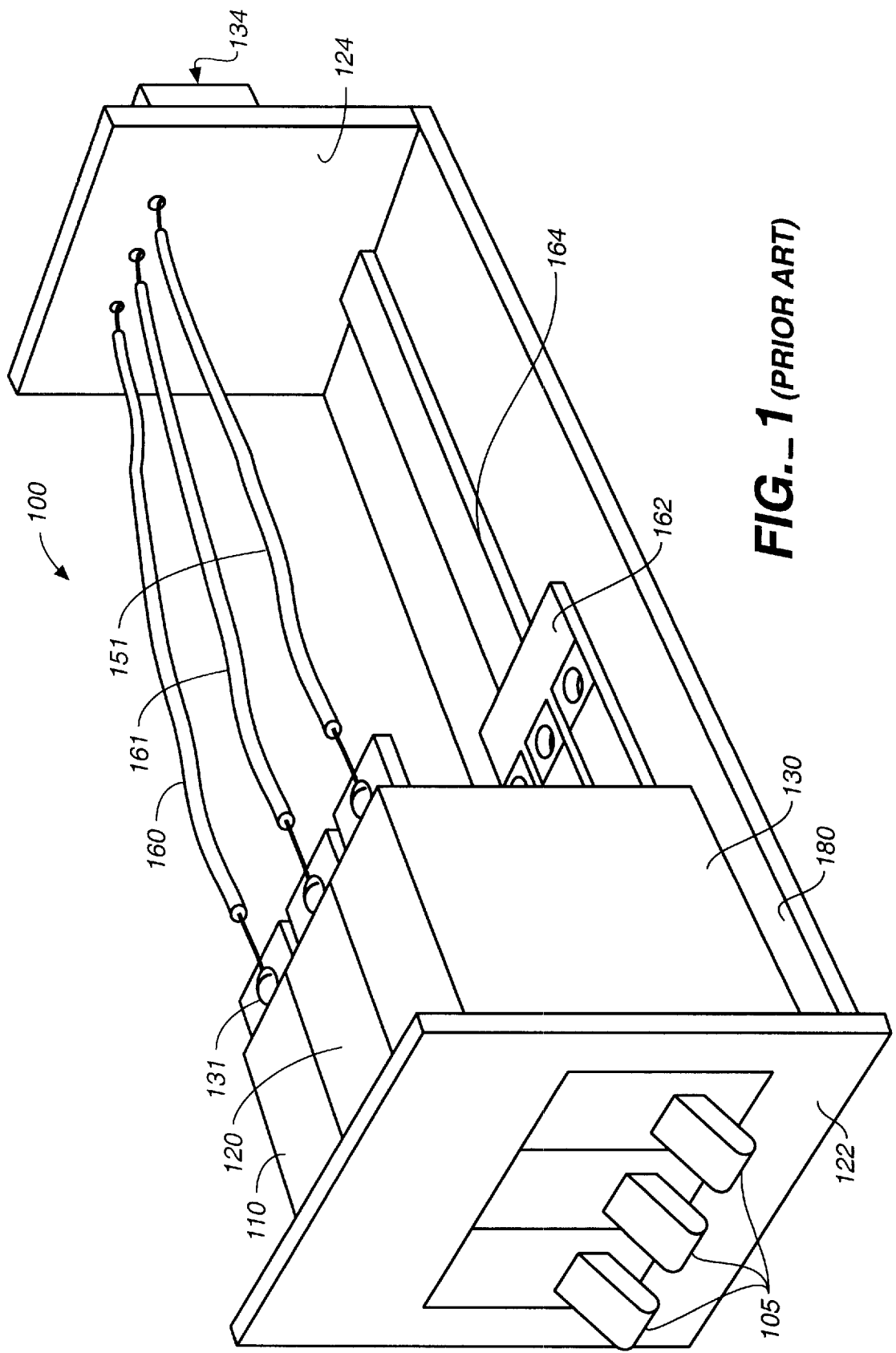
FIG._1 (PRIOR ART)

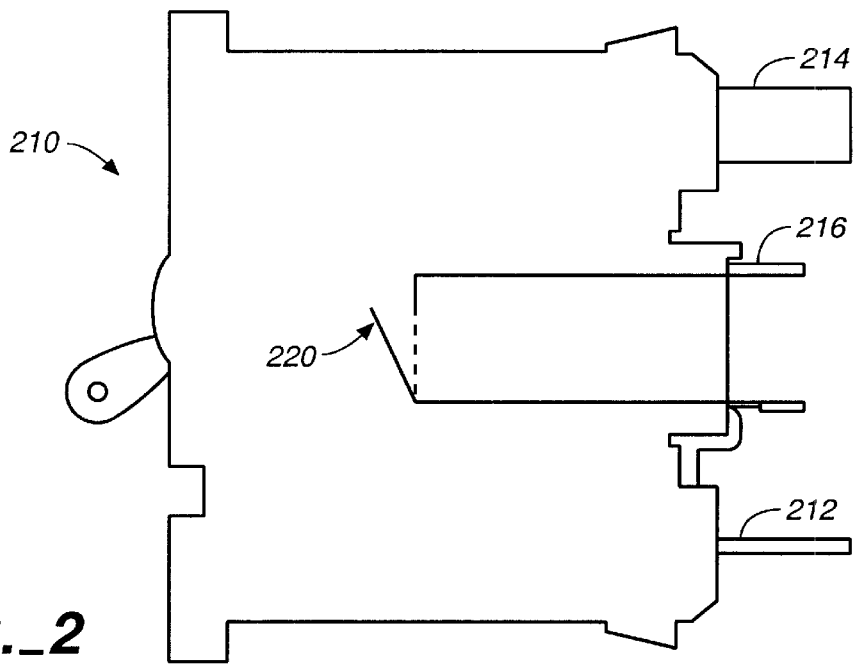
FIG._2
*(PRIOR ART)*
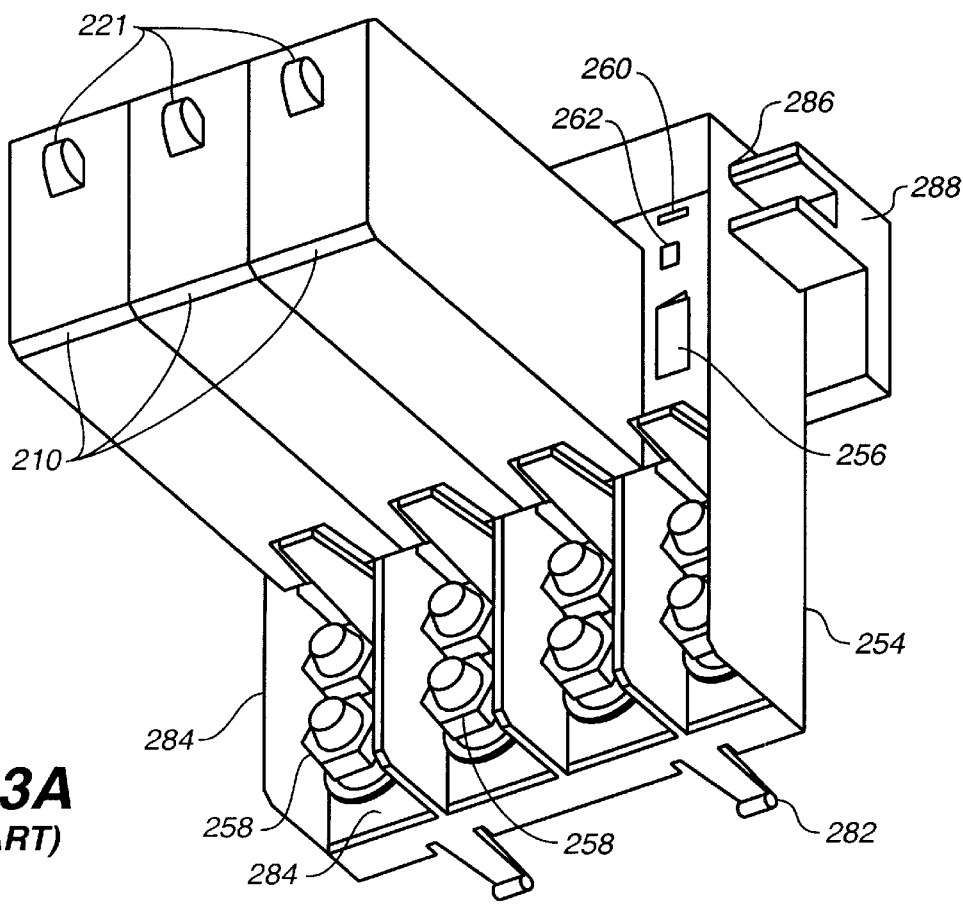
FIG._3A
*(PRIOR ART)*

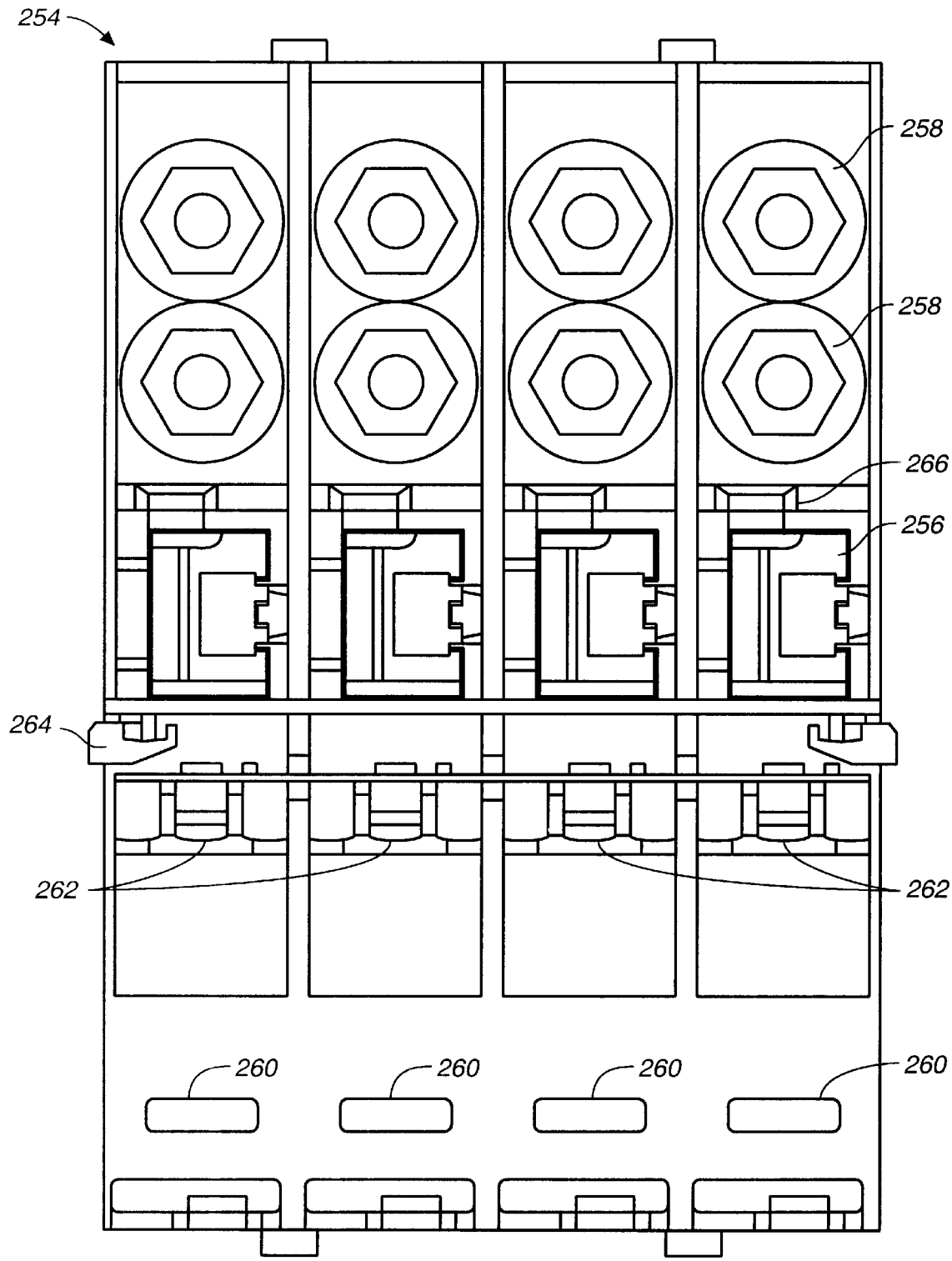
FIG._3B *(PRIOR ART)*

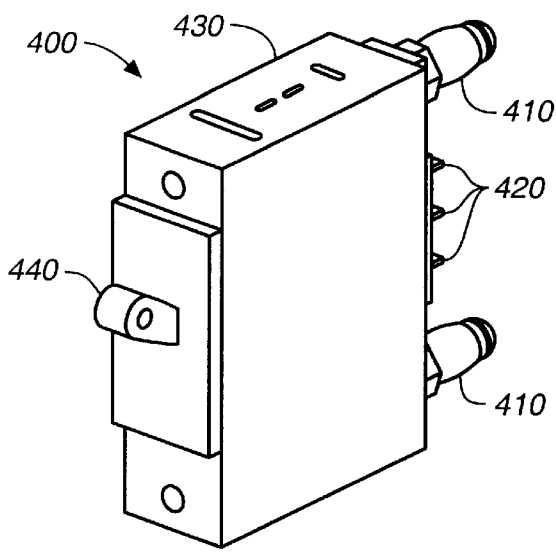
FIG._4
(PRIOR ART)
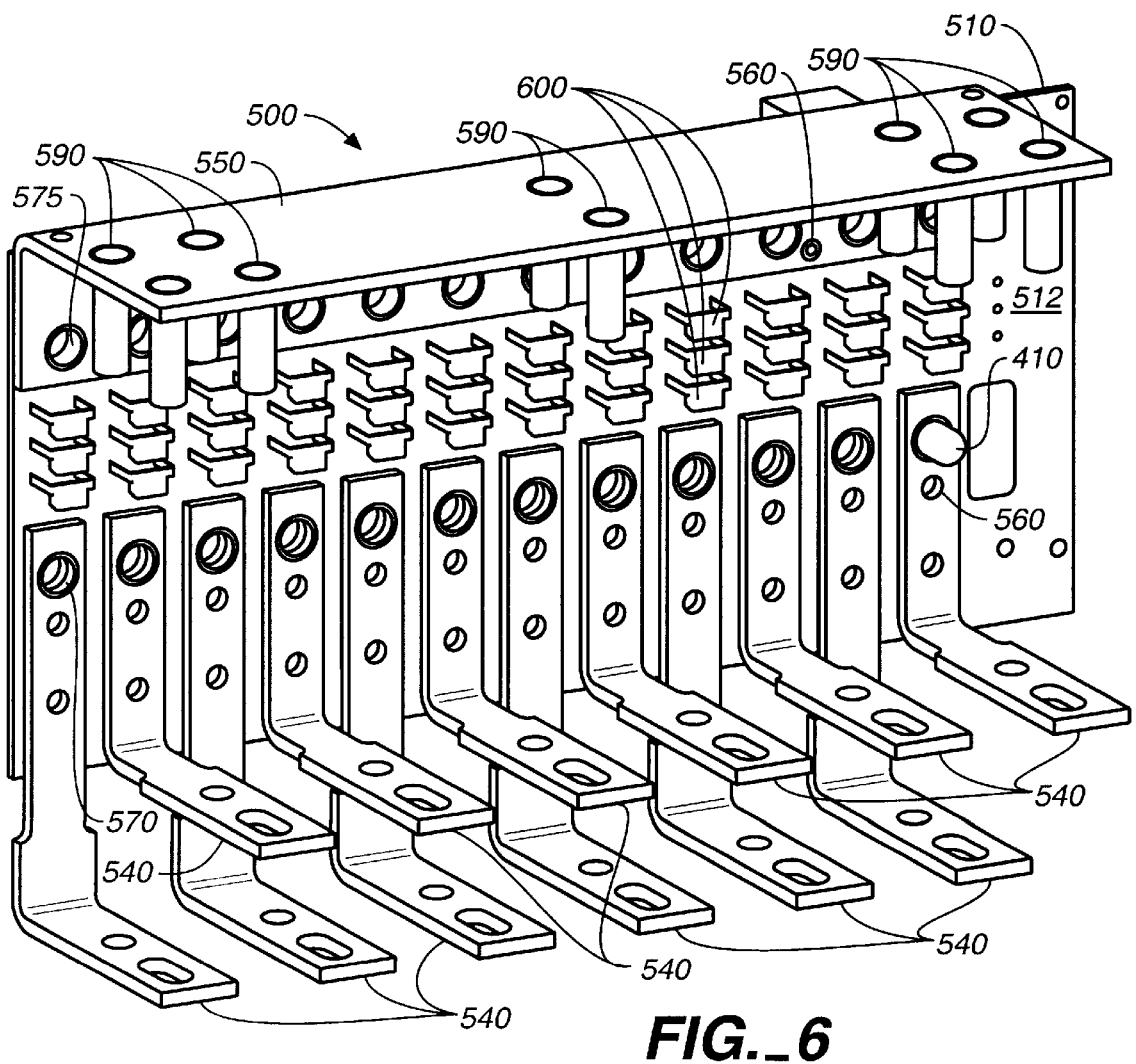
FIG._6

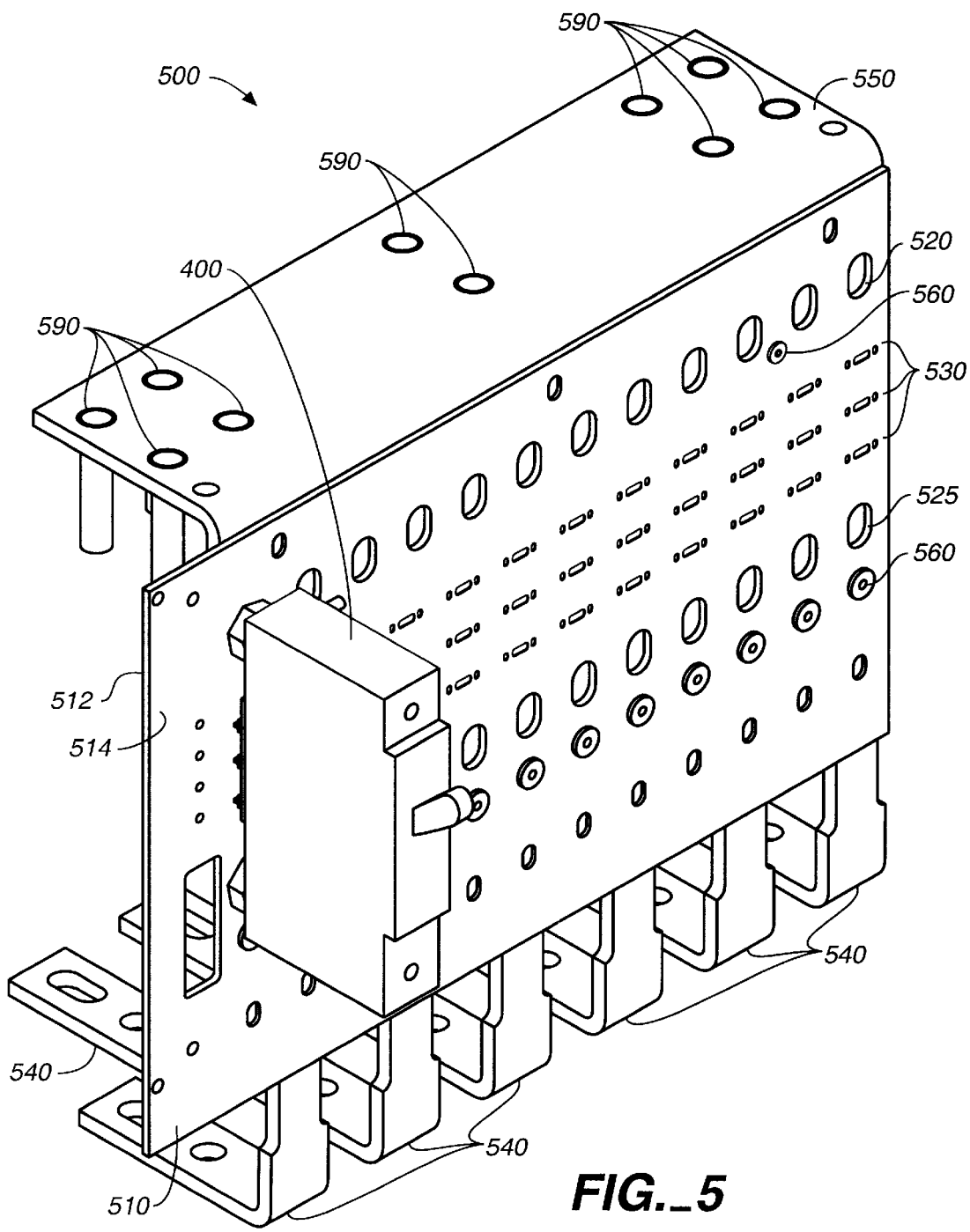
FIG._5

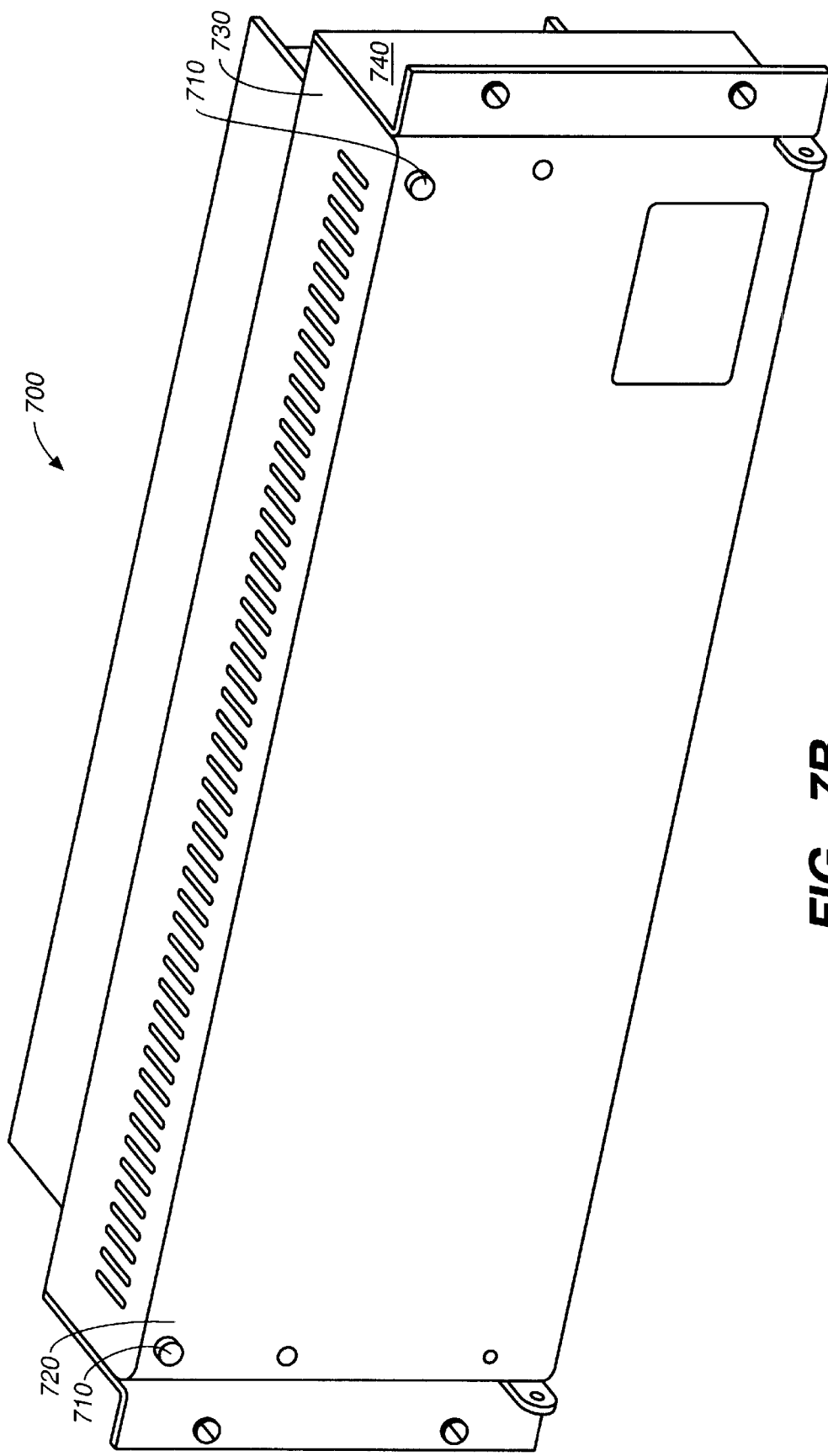
FIG._7B

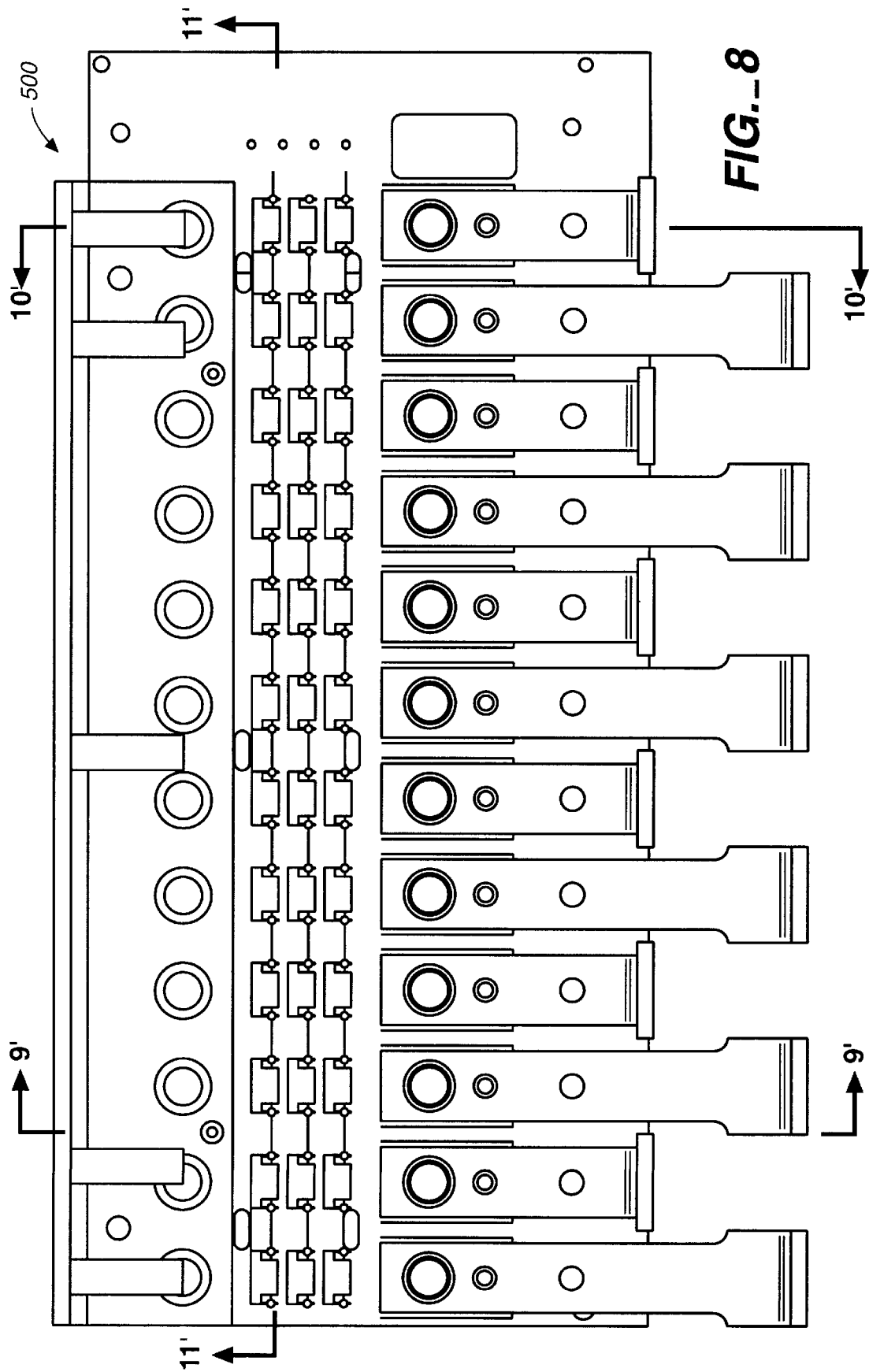

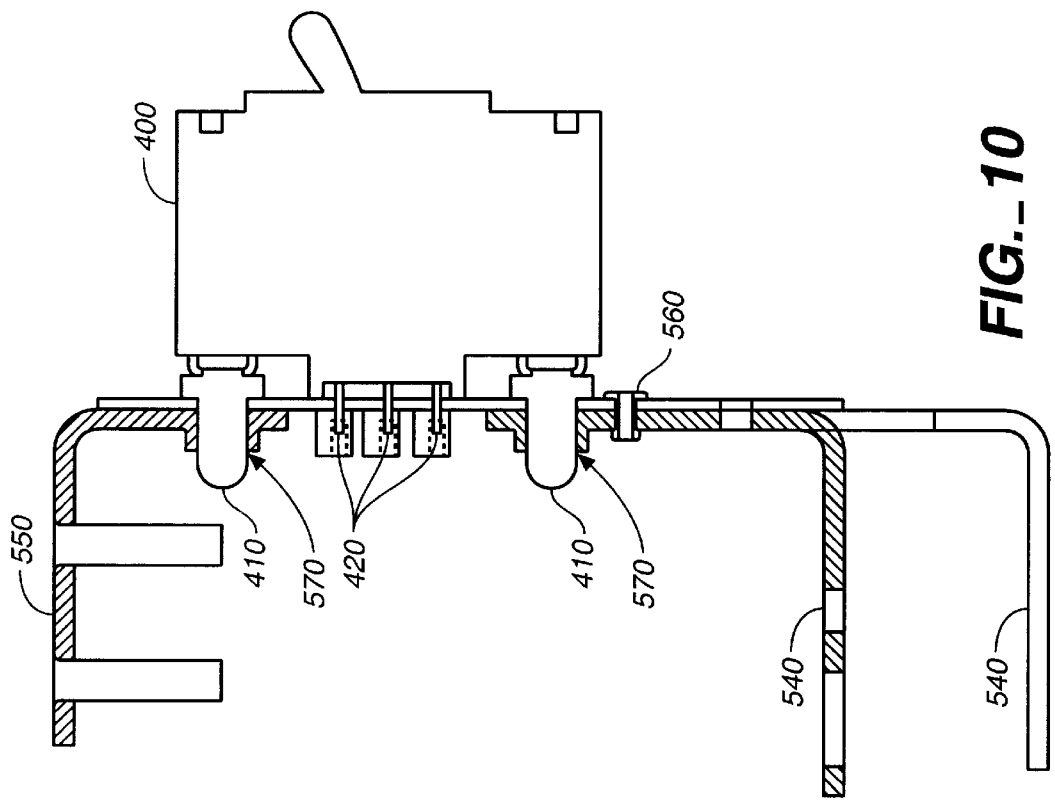
FIG._10
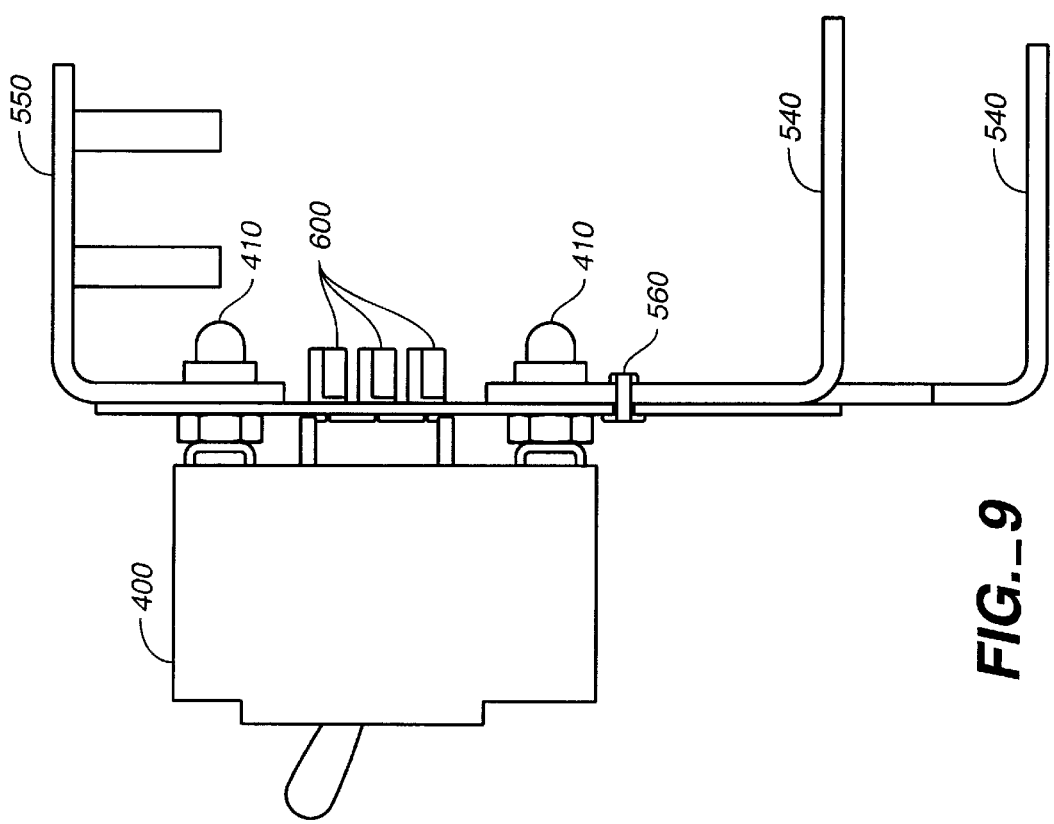
FIG._9

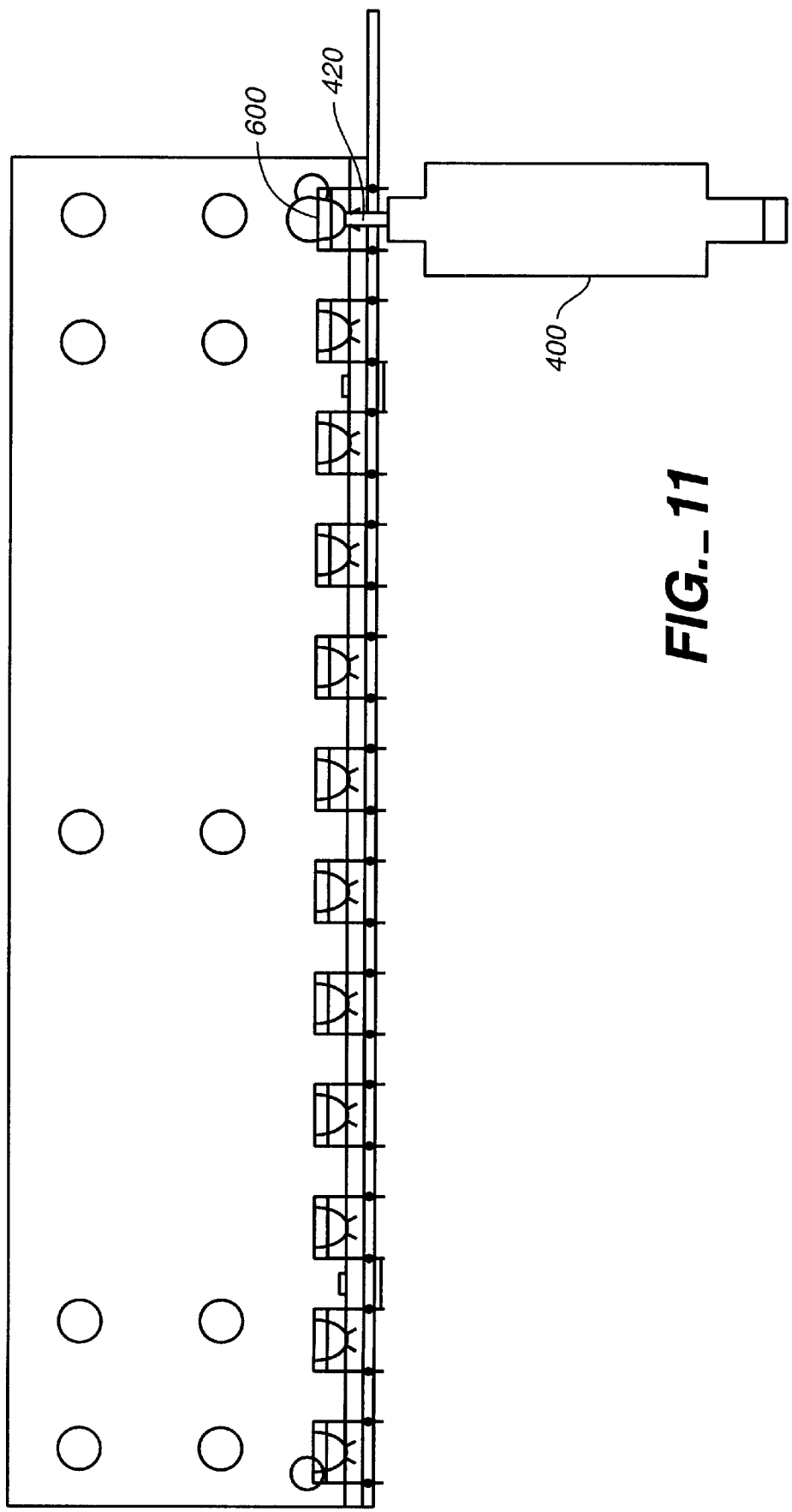

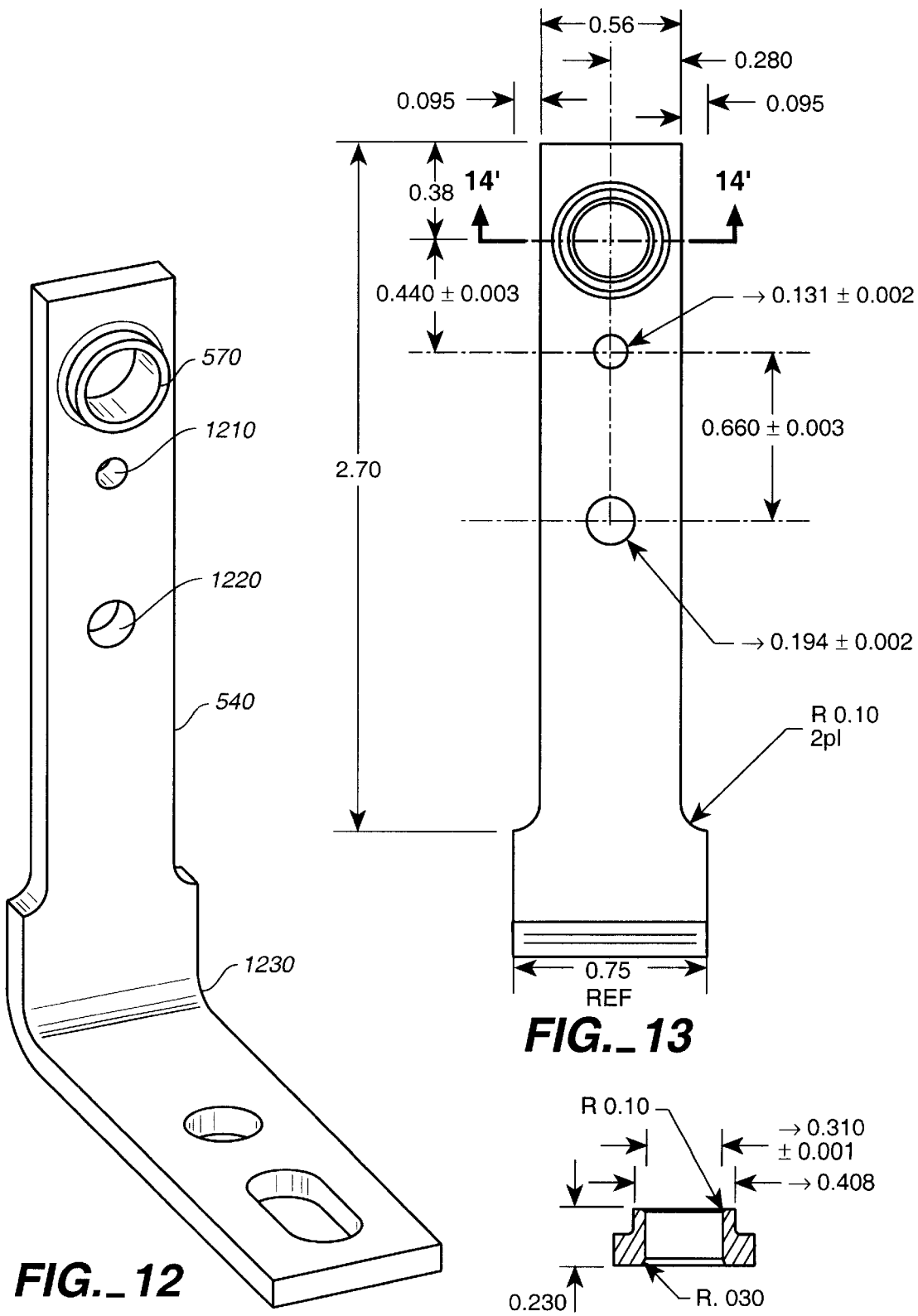

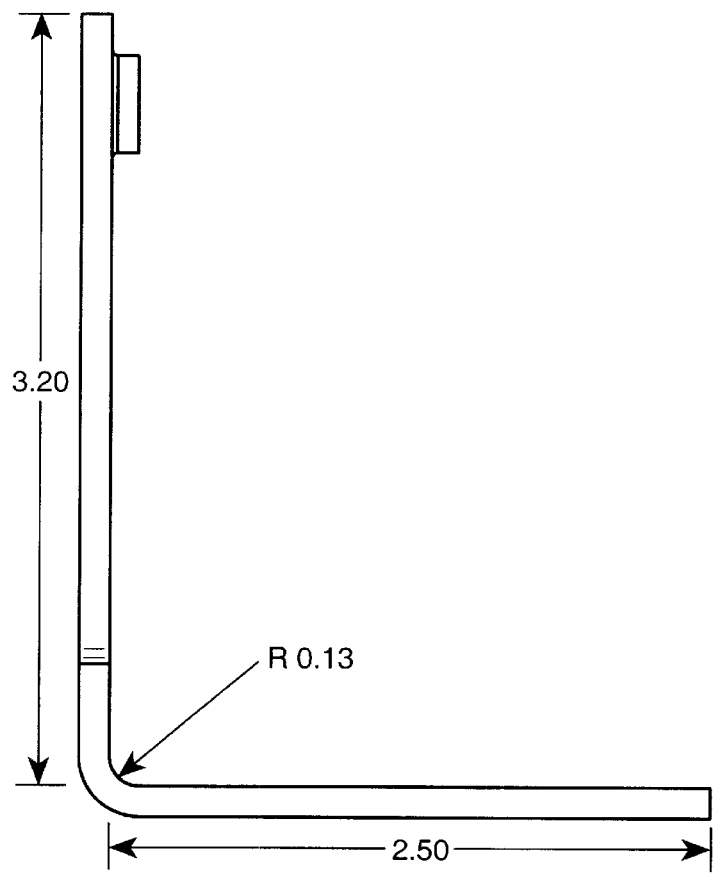
FIG._15
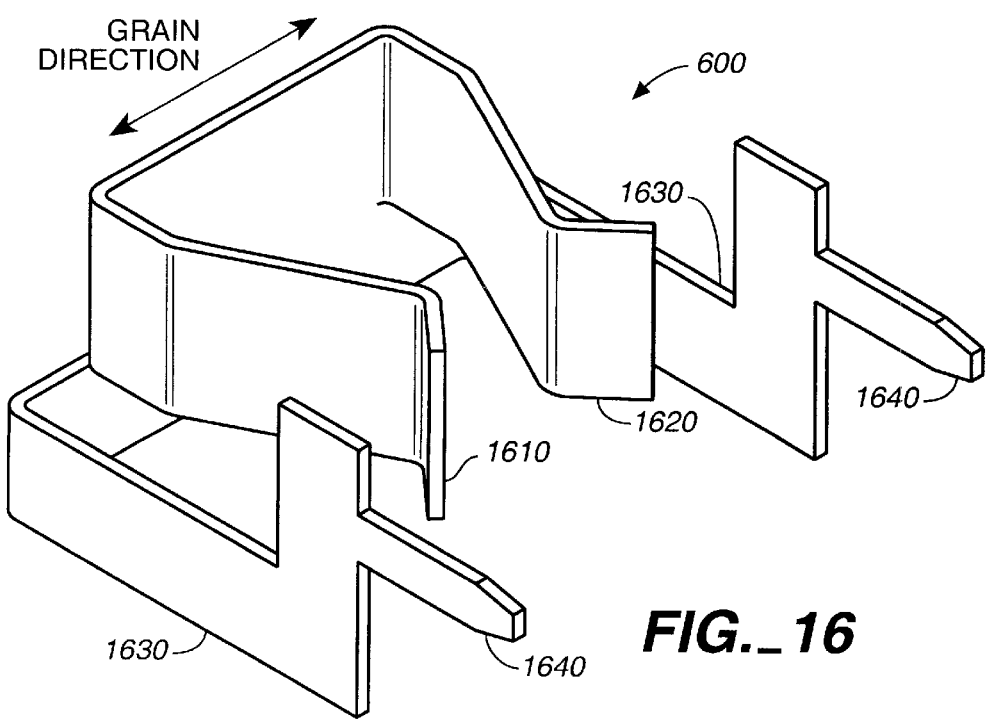
FIG._16

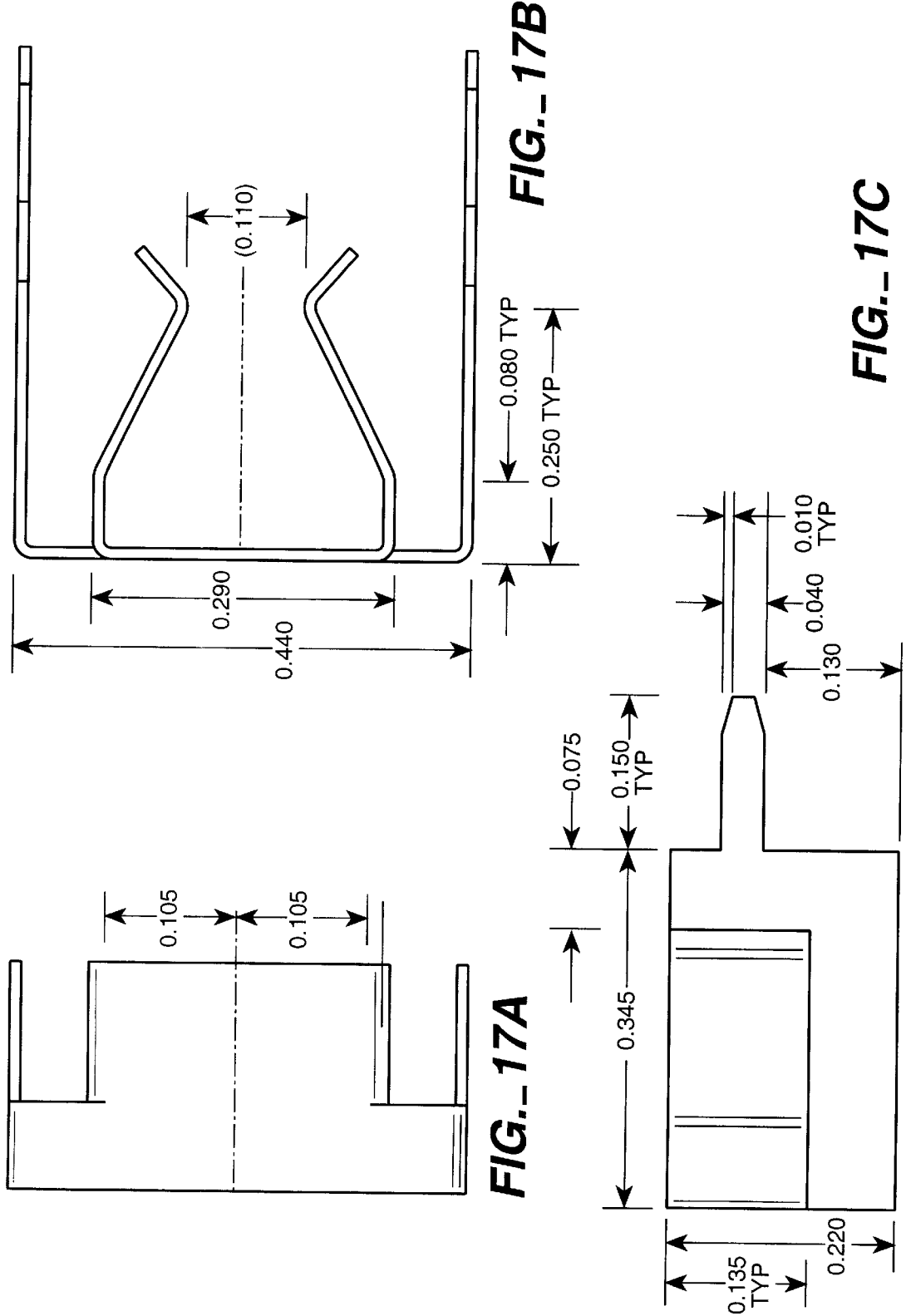

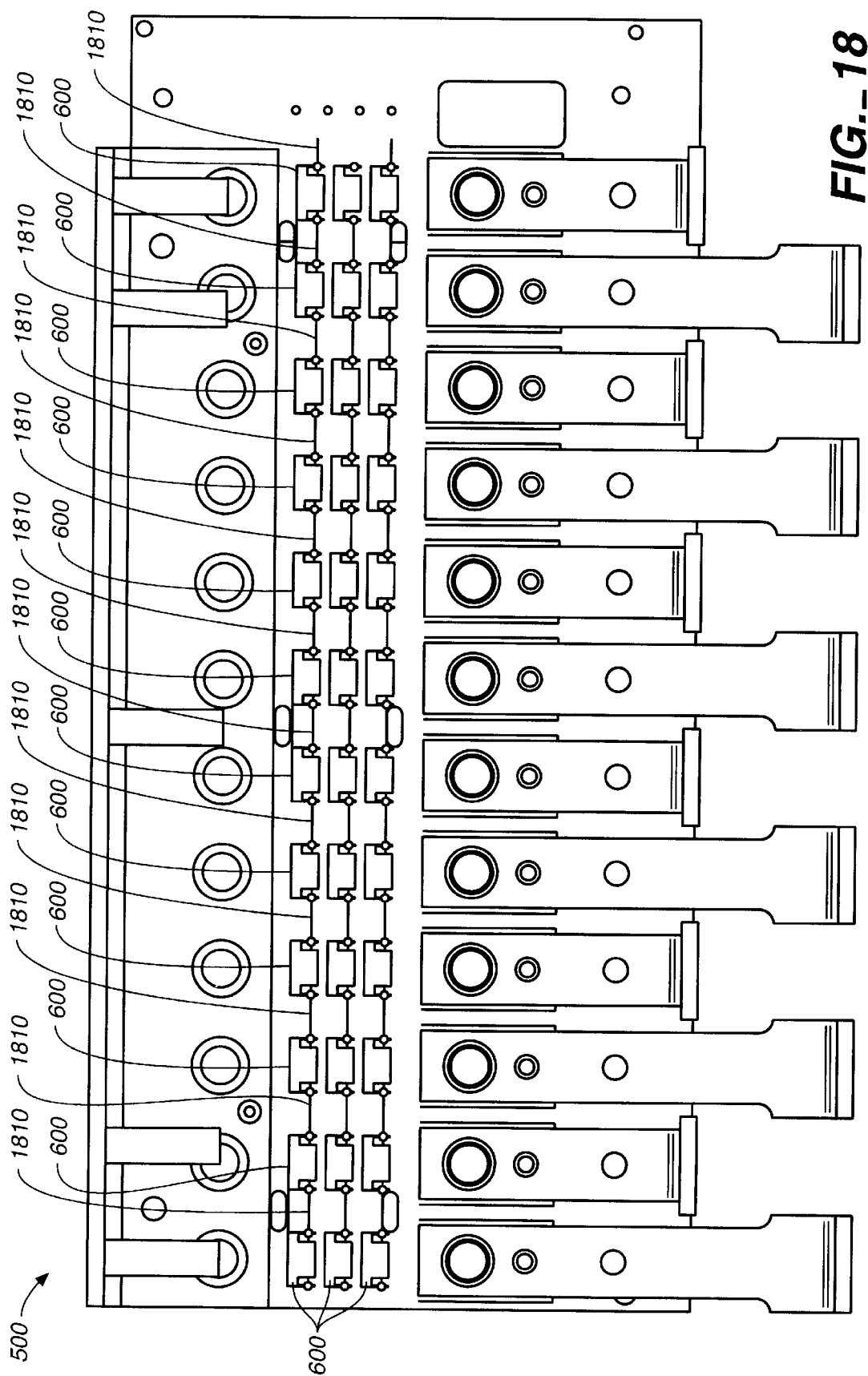
FIG._18

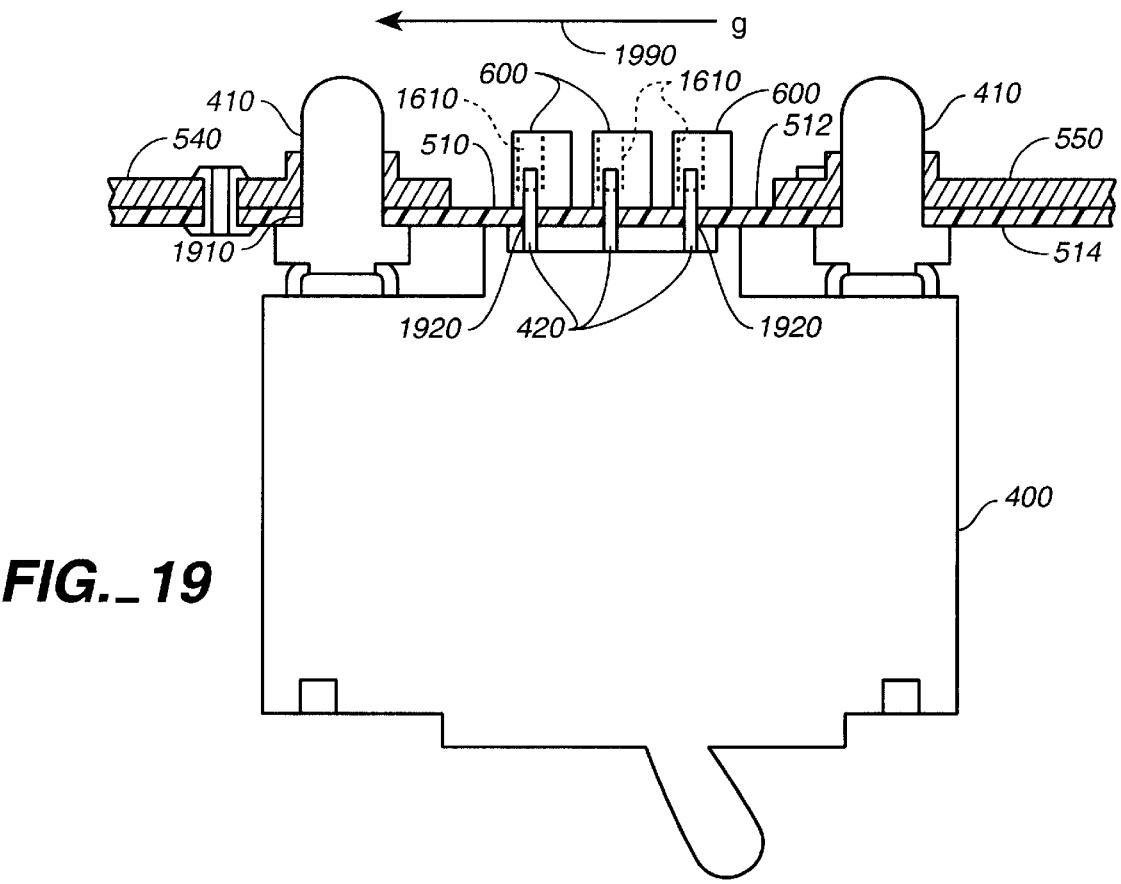
FIG._19
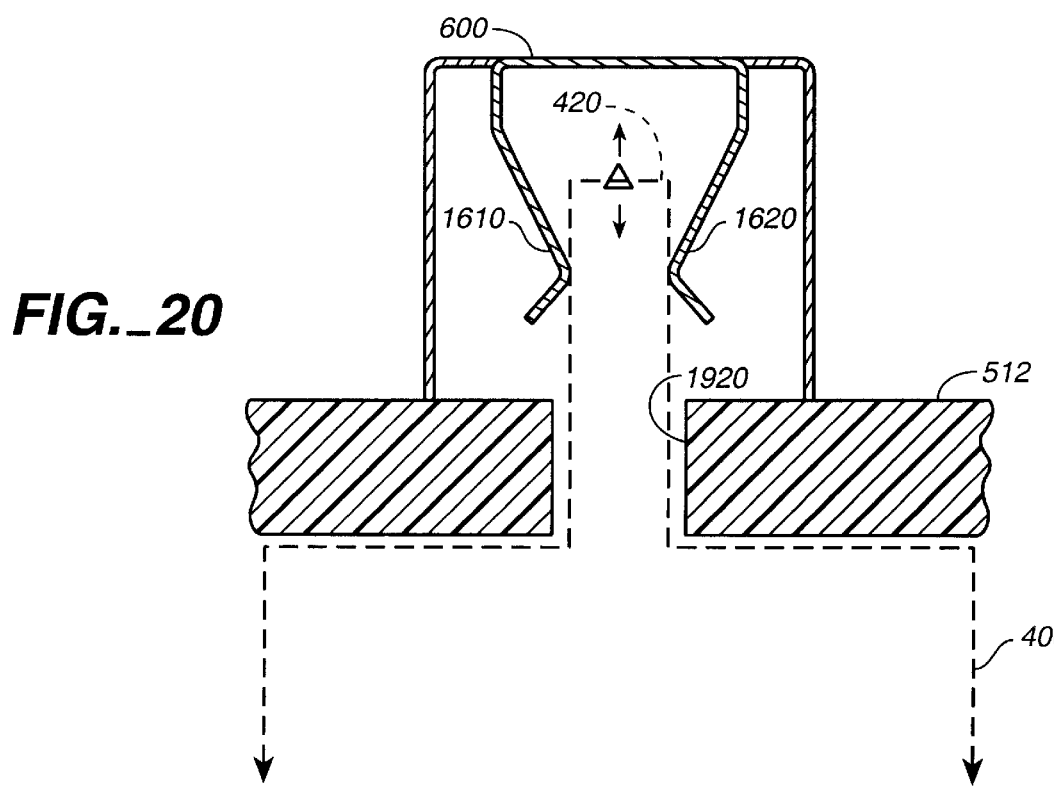
FIG._20

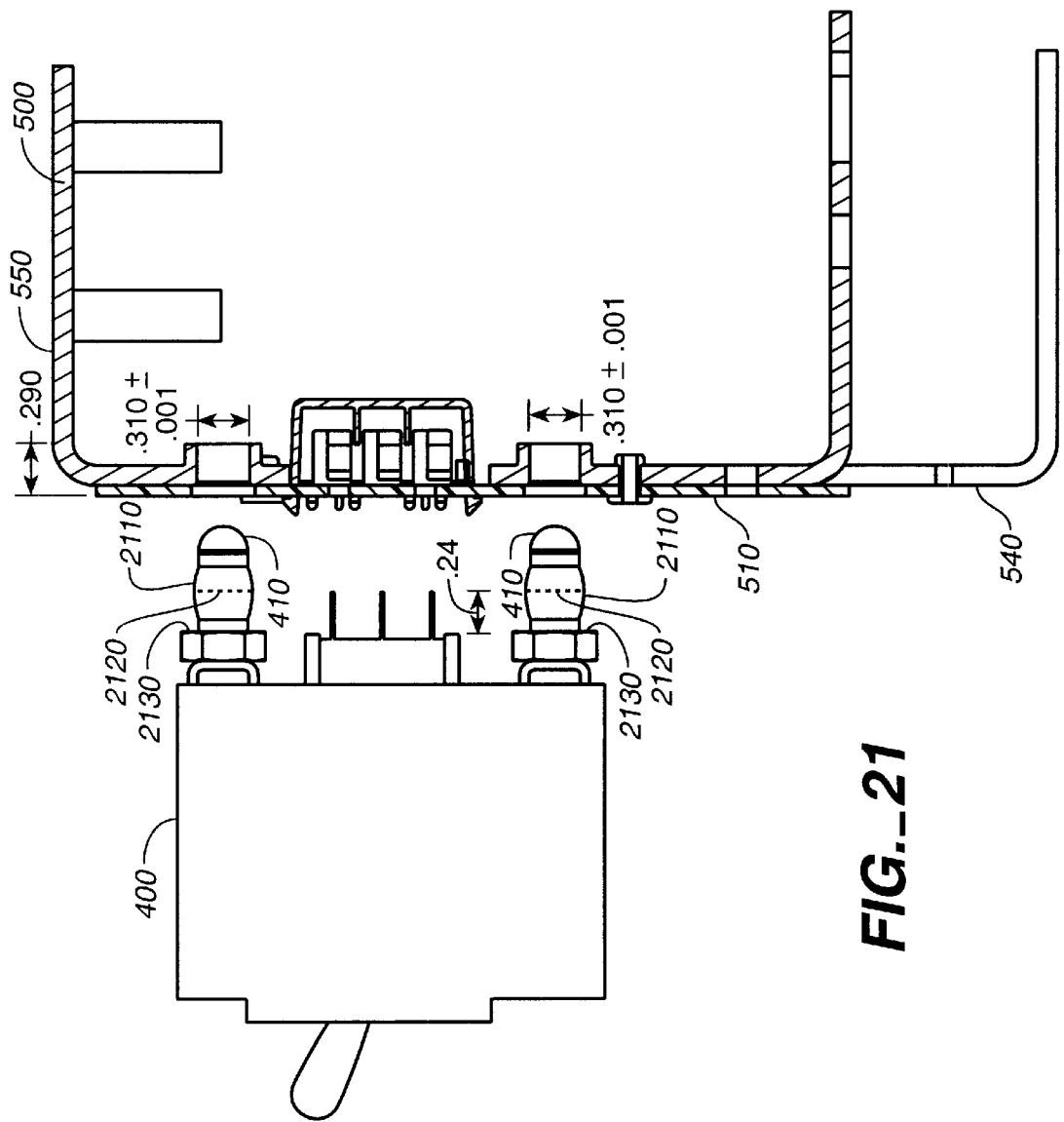
FIG._21

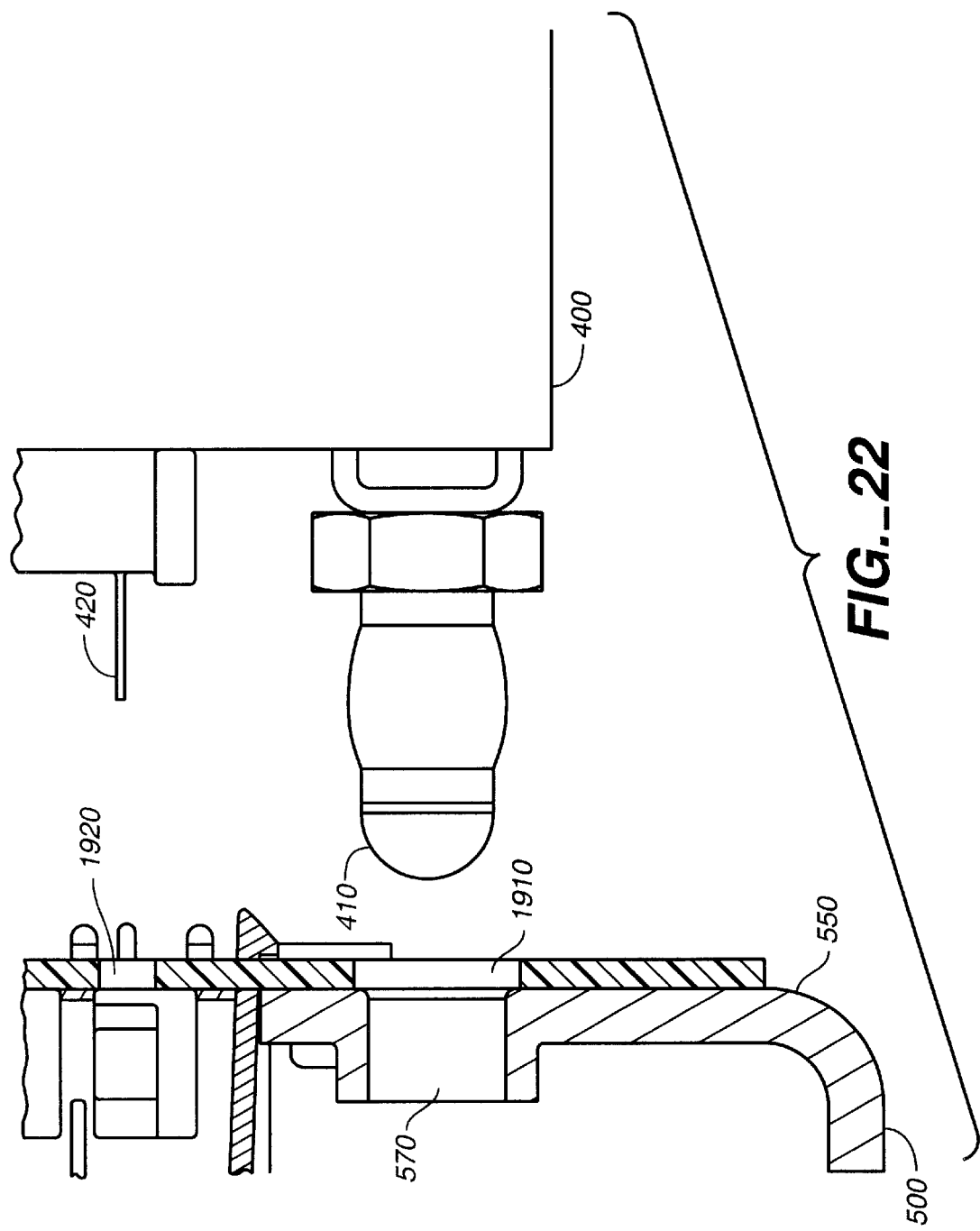

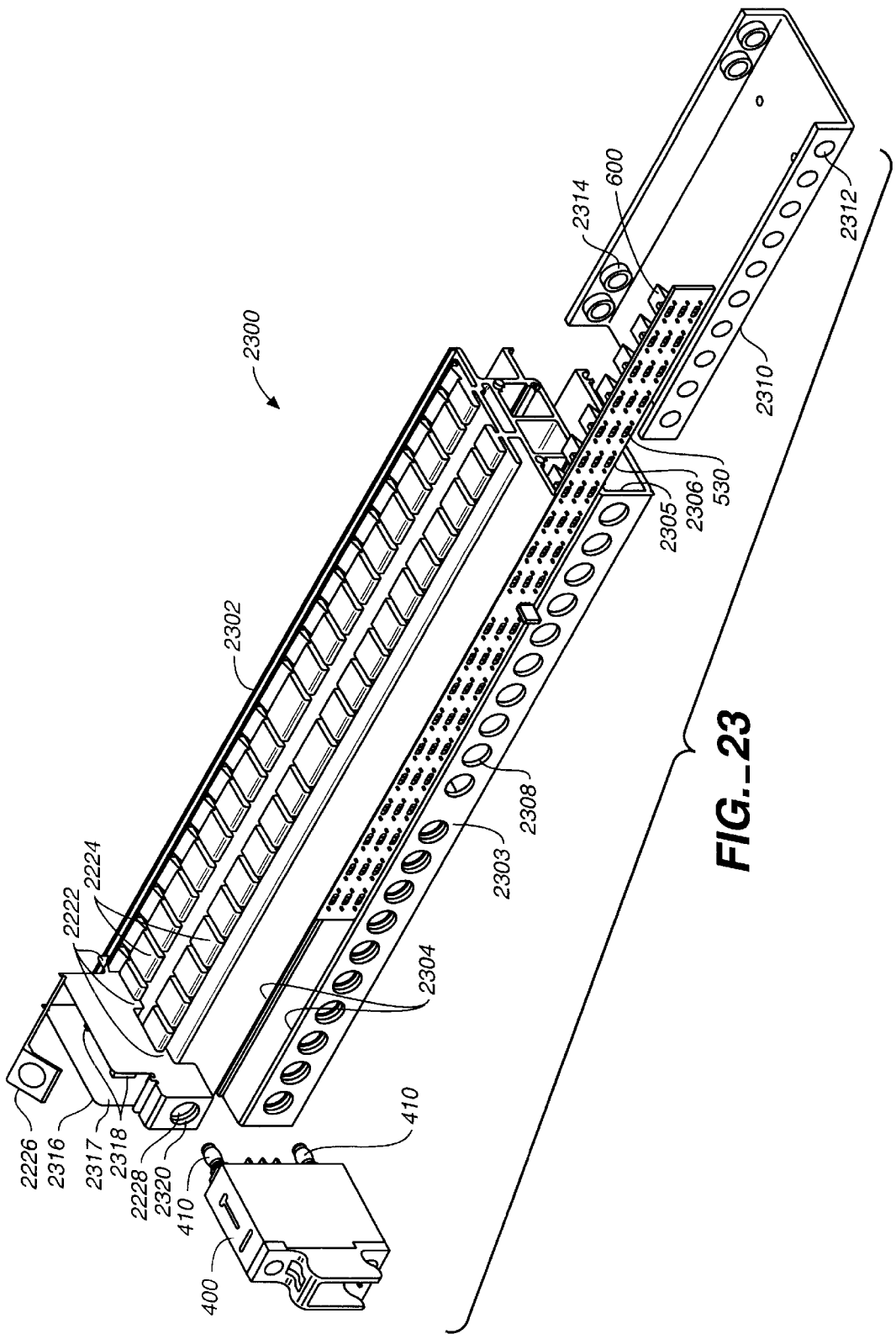
FIG._23

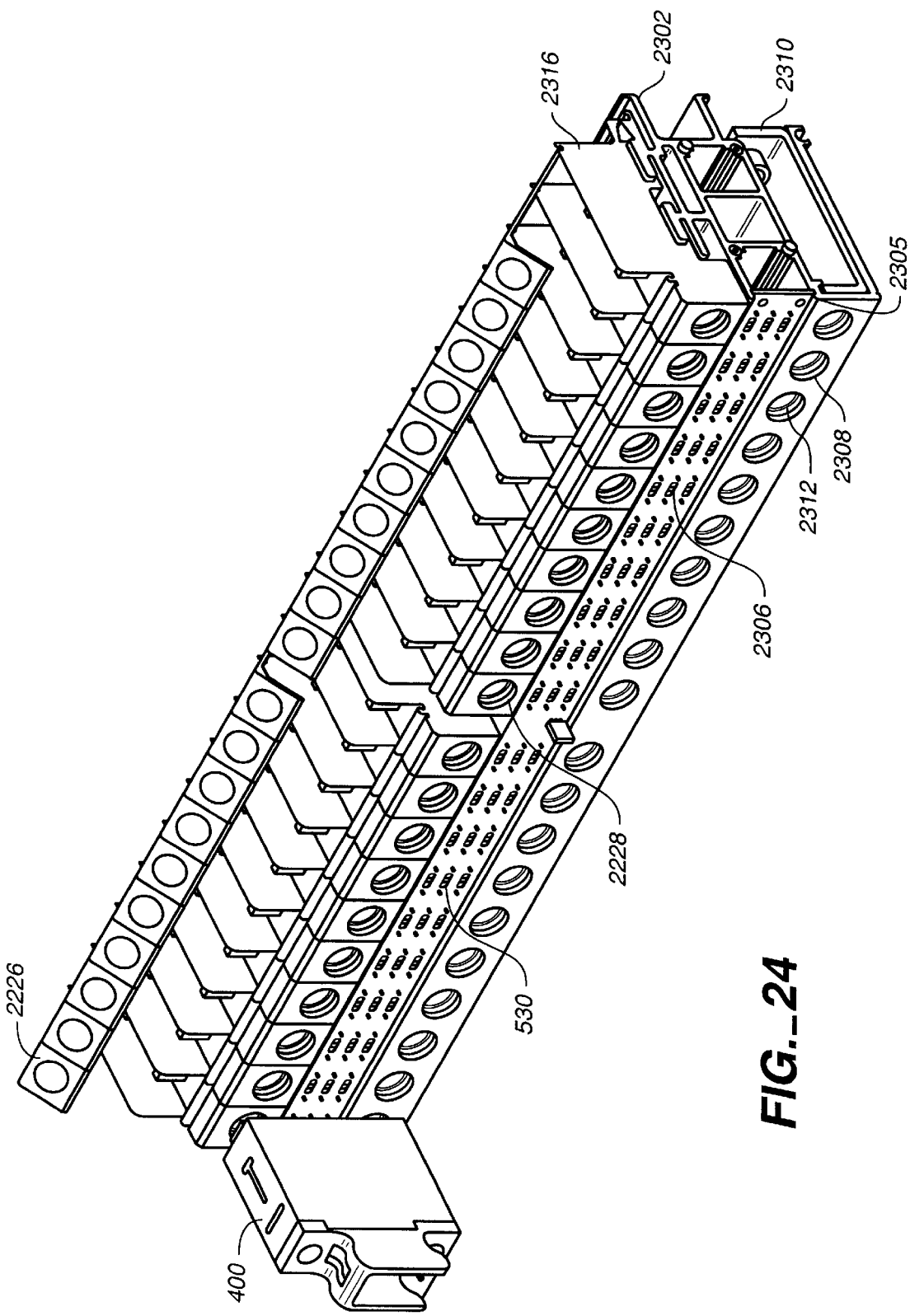
FIG._24

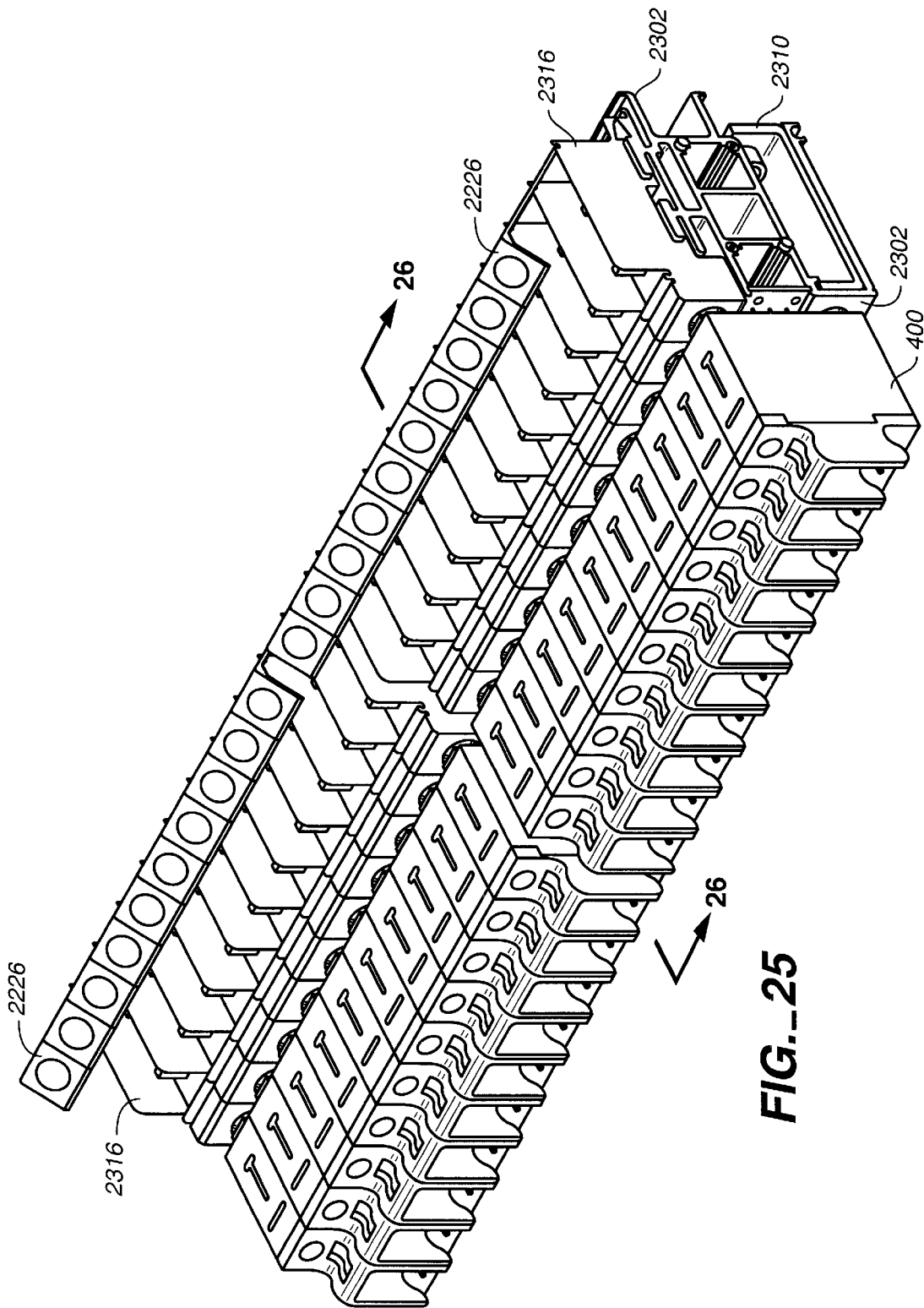
FIG._25

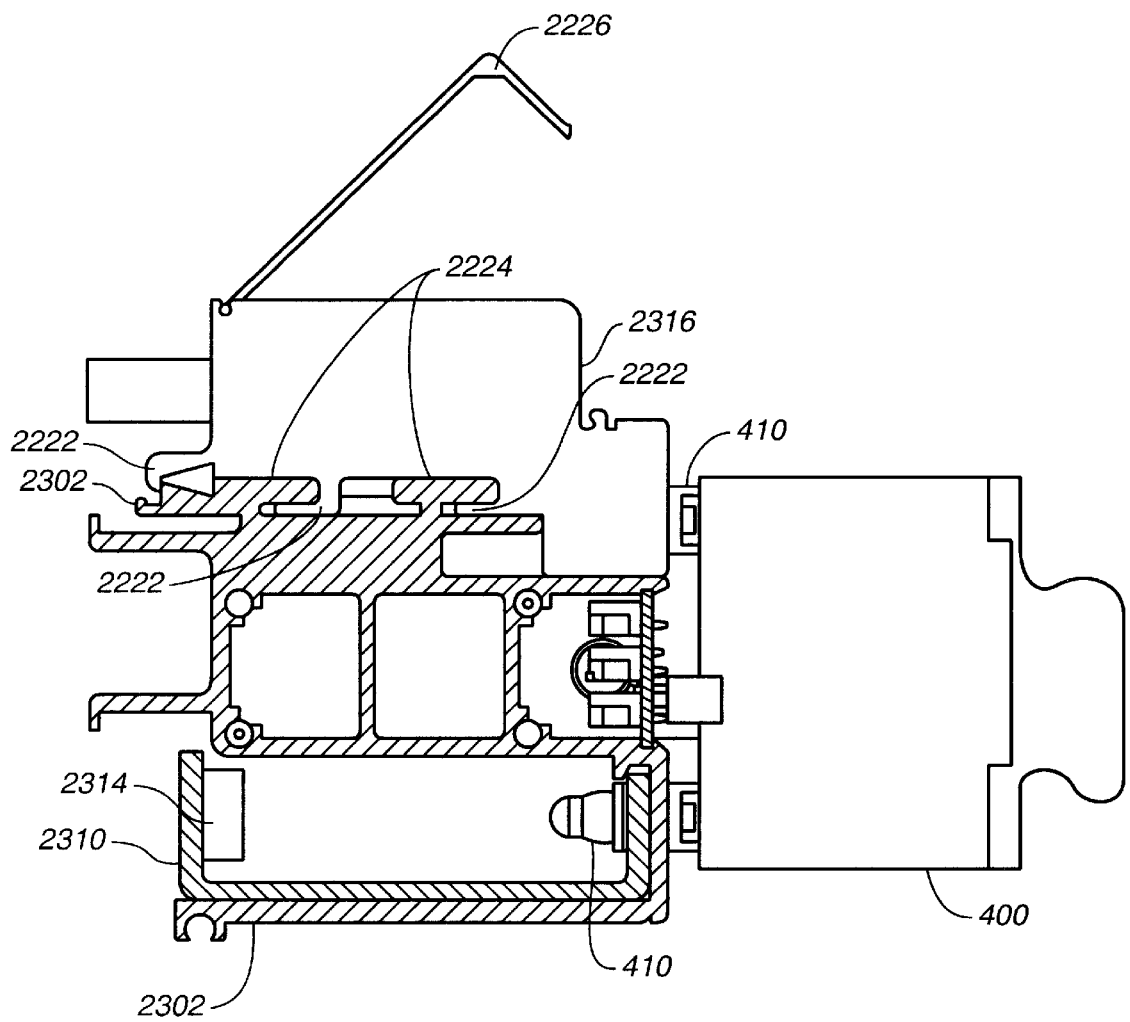
FIG._26

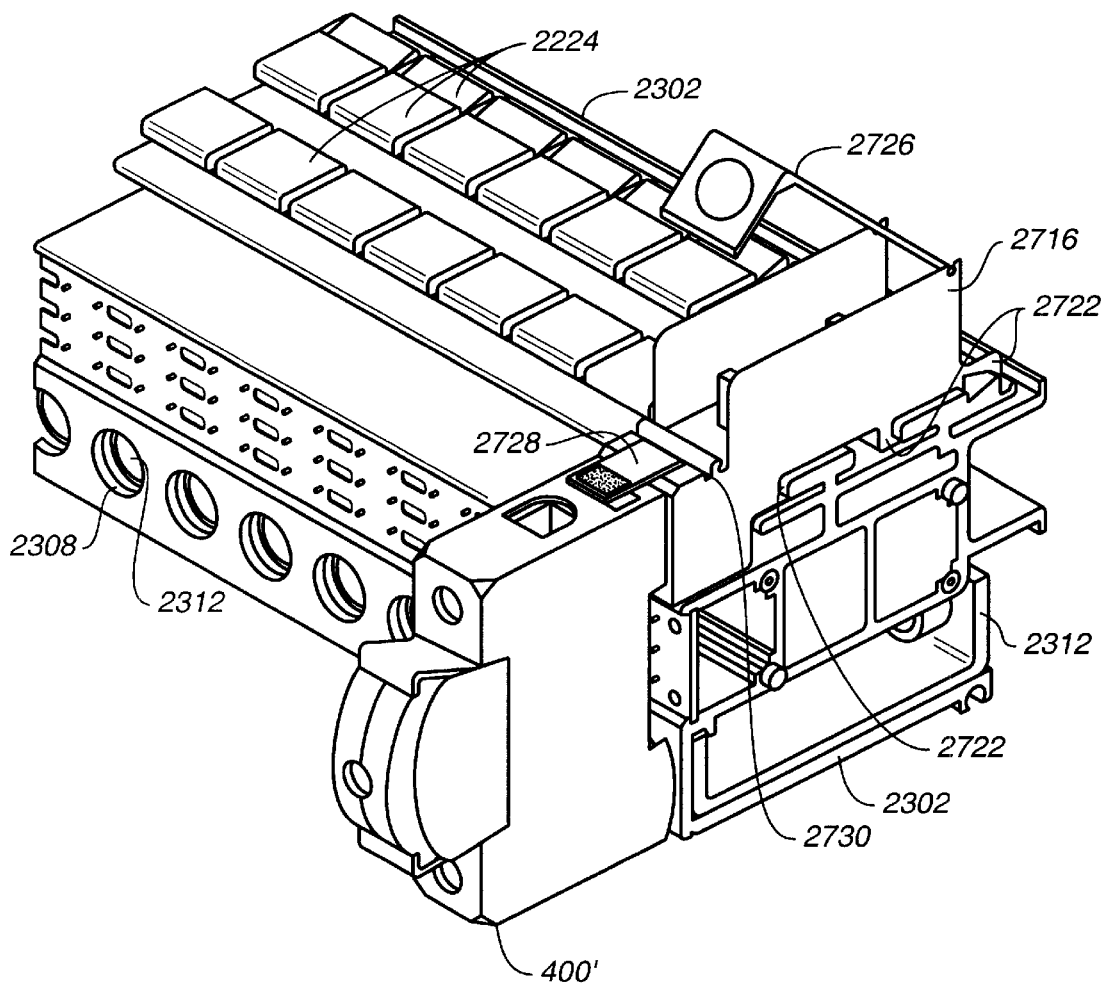
FIG._27

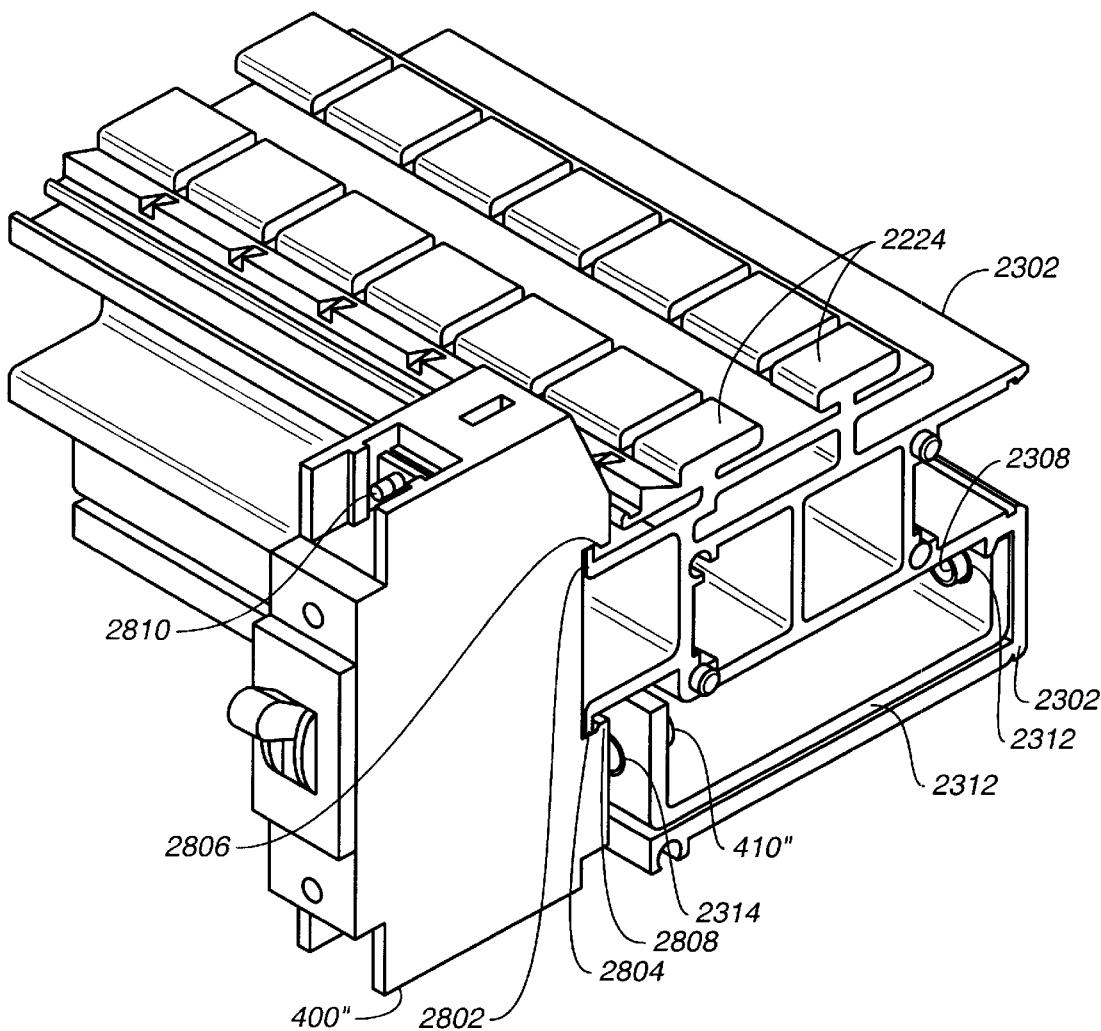
FIG._28

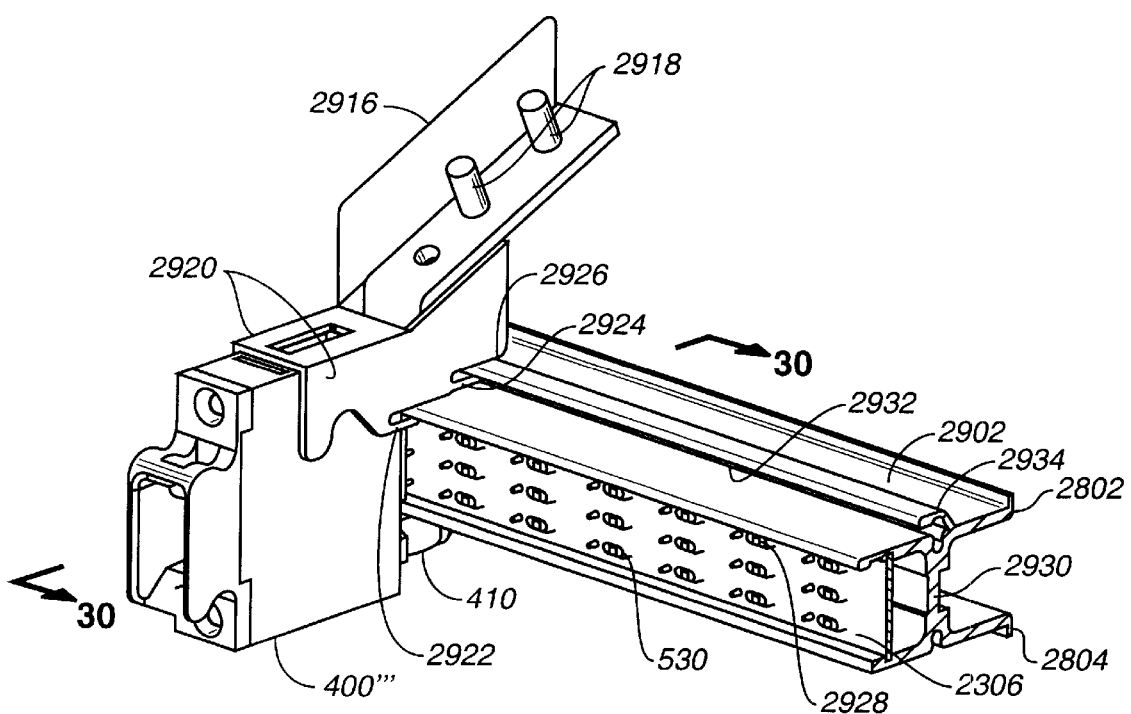
FIG._29

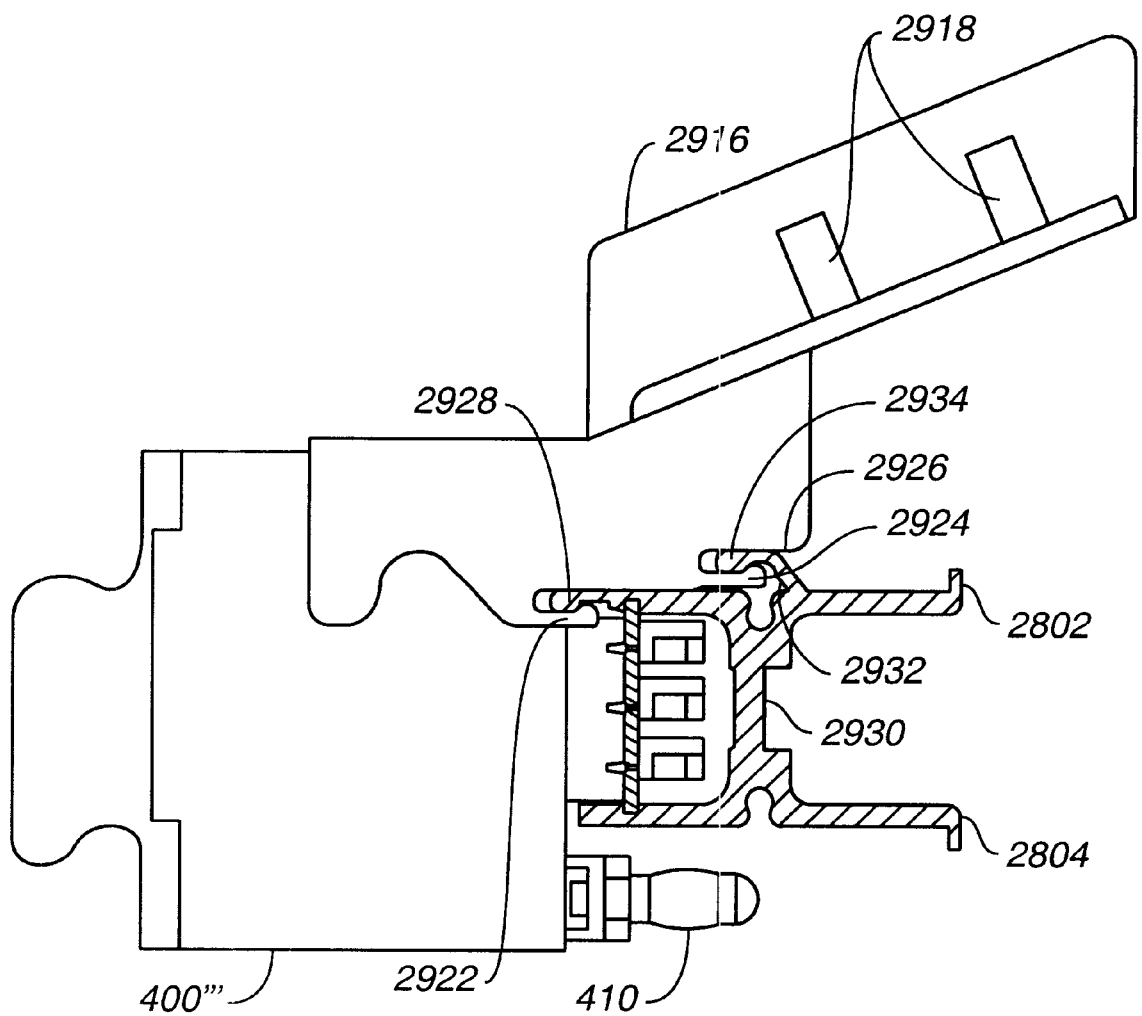
FIG._30

MODULAR DISTRIBUTION ASSEMBLY

RELATED APPLICATION

This application is a continuation-in-part (CIP) application of U.S. application Ser. No. 09/326,737, filed on Jun. 4, 1999, now issued as U.S. Pat. No. 6,315,580, the disclosure of which is incorporated by reference herein.

FIELD OF THE INVENTION

The present invention relates generally to a DC distribution module for mounting a plurality of overcurrent protection devices, such as circuit breakers or fuse modules. More particularly, the present invention is directed to an assembly of one or more modular busbar modules for mounting a plurality of plug-in circuit breakers and fuse modules, wherein the busbar modules contain female receptacles for line and load male plugs, also known as positive and negative power terminals, along with female plugs for auxiliary alarm contact terminals.

BACKGROUND OF THE INVENTION

There are numerous electrical system applications which require the use of a plurality of overcurrent protection devices, such as circuit breakers or fuse modules, to shut off current in one or more portions of the electrical system in response to an overcurrent condition. Fuses typically have a conductive wire element that rapidly heats and melts in response to an overcurrent condition, forming an open circuit. Fuses are often packaged in fuse modules containing additional circuit elements which transmit an alarm signal if the fuse opens in response to an overcurrent condition. Circuit breakers commonly comprise a movable electrical breaker contact and a stationary breaker contact. The movable electrical contact is typically coupled to an actuator mechanism that utilizes an electromagnetic device to open the breaker contacts when an over-current condition is detected. During normal circuit operation, the actuator mechanism electrically couples the breaker contacts so that the circuit breaker is in a conducting, or on-state. However, when an over-current condition is detected, the circuit breaker trips, and enters a non-conducting, or off-state. A handle on the external surface of the circuit breaker is commonly coupled to the actuator mechanism. The actuator-handle provides a visual indication of the state of the circuit breaker (e.g., on, tripped, and off) while also permitting the user to reset the circuit breaker after the circuit breaker has been tripped or to deliberately turn the circuit breaker off during routine repair or maintenance. Some circuit breakers include an additional alarm circuit, which sends an alarm signal to other circuits when the alarm circuit senses that the circuit breaker has been tripped.

FIG. 1 shows a perspective view of a prior art circuit breaker module 100 used in a power distribution module. A plurality of circuit breakers 110, 120, 130 are coupled by frictional forces or by mechanical connectors to base 180 and front face plate 122. Each circuit breaker 110, 120, 130 has a corresponding actuator handle 105. As shown in FIG. 1, screw connectors 131 are commonly used to electrically couple circuit breakers 110, 120, 130 to busbars 162, 164 and connectors 160, 161, 151 to couple current to a rear connector 134 on panel 124. Bus bars 162, 164 couple a negative polarity power terminal, often called a line terminal, of each circuit breaker 110, 120, 130 to a negative power terminal. Connectors 160, 161, 151 separately couple the load terminal, often called the positive power terminal, of each circuit breaker 110, 120, 130 to separate electronic loads.

While circuit breaker module 100 provides the benefit of several circuit breakers 110, 120, 130 arranged to control the current or power in different portions of a power distribution module, it has several drawbacks. One drawback is that it may be inconvenient to replace one of the circuit breakers 110, 120, 130. Replacement of circuit breakers may be required if a circuit breaker is damaged. Additionally, circuit breakers may need to be replaced if it is determined that a different response is required by the circuit breaker. For example, the user may determine that a higher amperage circuit breaker is required for a particular application. The time to replace a circuit breaker 110, 120, 130 in module 100 may be significant because the total time to replace a circuit breaker includes the time to: 1) withdraw the module; 2) remove any exterior housing elements surrounding the screw connectors 131; 3) disconnect the screw connectors 131; 4) extract the old circuit breaker; 5) insert a new circuit breaker; 6) connect screw connectors 131 to the new circuit breaker; 7) attach any exterior housing elements; and 8) re-insert module 100.

Another drawback with circuit breaker module 100 is that the housing and connector are comparatively bulky. There is a general trend to miniaturize all aspects of power supply and power distribution systems. Unfortunately, the total volume of circuit breaker module 100, including connectors 131; busbars 162, 164; and connectors 160, 161, 151 is significant.

Still another drawback with module 100 is that it does not address the problem of circuit breakers with alarm circuits. Circuit breakers with alarm circuits typically have additional auxiliary terminals for sending an alarm signal that is indicative of the operating state of the circuit breaker. For example, an alarm circuit preferably sends a logical "high" signal from an alarm terminal to indicate that the circuit breaker has been tripped due to an overcurrent event. The alarm signal may, for example, be used to trigger an indicator light to alert the user that a circuit breaker has been tripped. Circuit breakers have two alarm contact terminals. More commonly, however, circuit breakers have three alarm contact terminals corresponding to normal-off, normal-closed, and common terminals. An electrical connection must be provided to each alarm contact terminal of each circuit breaker of a circuit breaker module. Unfortunately, this increases the complexity of the electrical connection required in a circuit breaker module.

FIG. 2 is a prior art side-view drawing of a circuit breaker 210 with an alarm circuit 220 providing an alarm signal via stab-type alarm terminal 216. Line contact 212 and load contact 214 also comprise stab-type connectors. Stab-type connectors are a type of connector that has a comparatively thin, blade-like connector surface which is pressed into a female connector slot or socket (i.e., "stabbed") to form a tight mechanical and electrical coupling. Stab-type connectors have the advantage that the small surface area of a male stab-type connector permits a significant penetration pressure to be applied in inserting the male connector. However, stab-type connectors have the disadvantage of having a comparatively small cross-sectional area for current to flow.

FIG. 3A is a perspective view of a prior art circuit breaker module 254 designed to be loaded with a plurality of circuit breakers 210 having stab-type line and load terminal connectors 212, 214 (not shown) and stab-type alarm contact terminal connectors 216 (not shown) as illustrated on the circuit breaker 210 of FIG. 2. For the purposes of illustration, three circuit breakers 210 are shown installed in a module 254 designed to hold a total of four circuit breakers. A busbar 288 is used to provide an electrical connection to line contacts 212. Contacts 256 are spring-biased receptacles configured to contact load contacts 214. Additional connector legs 282 facilitate installation of module 254 as an integral unit.

FIG. 3B is a top view of module 254 with circuit breaker 210 removed, to more clearly show the electrical connectors. Each aperture 260 allows passage of a line contact 212 (not shown) in order to receive power from a power source. Spring biased alarm contacts 262 are dimensioned to mate with corresponding alarm terminals 216 (not shown) for respective circuit breakers 210. The alarm contacts 262 are electrically connected to each other by alarm contact line 264. Load connectors 258 provide a bolt and screw connection site to secure external electrical lines.

While circuit breaker module 254 provides several benefits, it has several drawbacks. One drawback of stab-type connectors is that they have a limited structural strength, i.e., the comparatively small cross-sectional area of each stab-type terminal 212, 214 provides only limited resistance to transverse and rotational forces. However, if circuit breaker 210 is mounted to a socket perpendicular to a vertical surface, the force of gravity will generate transverse and rotational forces acting to dislodge the stab-type connectors. This may necessitate the use of long stab-connectors with a high contact pressure, which increases the difficulty of inserting or removing a circuit breaker. In some cases, additional support structures, such as a frame and screw connectors, are required to maintain a circuit breaker with stab-type connectors within their sockets. Another drawback with circuit breaker connector module 254 is that it does not address the need for reducing the cost per electrical connection. The cost of circuit breakers, like other electronic components, continues to decrease over time. It is desirable that the cost of the connector module divided by the number of circuit breakers decreases as the connector module is increased in size to accommodate a larger number of circuit breakers. This is commonly known as "increasing returns to scale." Stab connector receptacles 256, 262 will tend to have a substantially constant price per female receptacle, assuming that they are purchased from a commercial vendor in large production lots. However, as can be seen in FIGS. 3A and 3B, circuit breaker module 254 requires a substantial support structure including connector legs 282 and support surfaces 284 to facilitate removing or installing module 254 as an assembled unit into an electrical system. The material cost of the support structure will tend to increase as the module 254 is increased in size to connect additional circuit breakers. Consequently, it can be expected that there will be no significant cost reduction to increasing the size of module 254 to accommodate additional circuit breakers.

The need for a compact, low-cost circuit breaker connector module is especially important in the context of plug-in circuit breakers. As shown in FIG. 4, compact plug-in circuit breakers 400 commonly have power connections comprised of male plug-shaped connectors 410. Additionally, plug-in circuit breakers commonly include additional alarm contact terminal connectors 420 for transmitting an alarm signal. Typically there are three alarm contact terminals 420 corresponding to a common terminal, a tripped signal terminal, and an off-terminal. The alarm contact terminals may be any style of male plug, but are typically in the form of pins, prongs, or blades with planar surfaces.

It is desirable in many applications, such as telecommunication applications, to utilize a large number (e.g., ten to twenty) of plug-in circuit breakers 400 as part of a power distribution system. Unfortunately, there is no commercially available connector module that provides electrical connections to both the male plugs 410 and alarm contact terminals 420 of a single plug-in circuit breaker 400. Typically, separate wire connections are soldered to each of the alarm contact terminals 420 after the male plugs are plugged into two female socket receptacles.

Part of the problem of designing a connector module for a plug-in circuit breaker 400 is the different requirements of male plugs 410 and alarm contact terminals 420. The male plugs 410 of plug-in circuit breaker 400 preferably fit into female sockets (not shown in FIG. 4) with a friction fit so that the male plugs may be inserted or withdrawn in order to insert or remove the circuit breaker. In the context of circuit breakers without alarm contact terminals, this permits what is commonly known as "plug and play" operation, since both mechanical and electrical connection to the circuit breaker is made by inserting the plugs 410 into their sockets. However, the compact male alarm contact terminals 420 also require a reliable electrical connection in order to provide reliable alarm signals. Unfortunately, the differences in size, shape, and length of planar alarm contacts 420 compared with male plugs 410 make it difficult to design a low-cost connector socket that simultaneously mates with an appropriate friction fit to both types of male plugs 410 and auxiliary contact terminals 420.

The two different styles of male terminal connectors 410, 420 makes it difficult to achieve a friction fit with the appropriate connection length and pressure for both types of male connectors 410, 420 in a low-cost structure with reasonable fabrication tolerances. This problem is exacerbated in the context of circuit breaker modules in which the circuit breakers are mounted with the axis of the male connectors disposed perpendicular to the force of gravity, i.e., with the force of gravity acting to torque the male connectors. One potential solution to this problem is to use additional clamps or screws to apply a pressure between the male connectors and sockets. Clamps and screws are commonly used in some types of electrical connectors to facilitate the mating of different types of male connectors to a common female connector. However, additional clamps or screws increase the cost of the connector and also require the user to spend additional time to adjust the clamp or screws in order to remove or install the male connector. Moreover, clamps and screws are inconsistent with "plug and play" operation.

As none of the conventional approaches meet these needs in a fully satisfactory manner, what is desired is a distribution assembly for accommodating a plurality of overcurrent protection devices in which all of the male connectors of each overcurrent protection devices are demountable with the female sockets of the assembly by friction coupling. There is a need to expand the connector modules in an easy and convenient manner to enable a large number of plug-in circuit breakers and fuse modules to be accommodated as a part of a power distribution system for telecommunications applications. No known prior art connector module design possesses all of the desired characteristics in a modular distribution assembly.

SUMMARY OF THE INVENTION

A first embodiment of the present invention is directed towards a connector module for providing what is called "plug and play" electrical connections to a plurality of overcurrent protection devices in which the electrical connections to each overcurrent protection device are automatically made by inserting the overcurrent protection device into the connector module. The present invention generally comprises a connector module for mechanically mounting and providing electrical connections to a plurality of overcurrent protection devices each having first and second male electrical plugs, including: a mounting substrate having a first side and a second opposed side; first and second plug passageways disposed in said substrate for each overcurrent protection device, the plug passageways shaped and spaced apart from each other to permit the passage of the two male plugs of each overcurrent protection device through the passageways in the direction from the first side to the second side; a conductive load busbar member for each of the first plug passageways, each of the conductive members mounted by a mechanical connector to the second side of said substrate and having a socket shaped and positioned to mate with a friction fit with a corresponding male plug extending through the first connector passageway; and a conductive common busbar member mounted by a second mechanical connector to the second side of the substrate, the support member having sockets shaped and positioned to mate with a friction fit with a corresponding male plug extending through the second connector passageway; wherein the substrate contains insulating surface regions on the first and second sides so that the first male plugs of each overcurrent protection device and their corresponding load busbar members are electrically insulated from the second male plugs and from each other.

The first embodiment of the connector module of the present invention is directed towards providing plug and play electrical connections to a plurality of circuit breakers, wherein each circuit breaker has both male plugs and auxiliary signal terminals. In the first embodiment, the mounting substrate is a printed circuit board and further comprises auxiliary signal terminal passageways and clips mounted to the second side of the substrate to provide an electrical connection to the auxiliary signal terminals.

One object of the present invention is a low-cost connector module adapted for plug-in circuit breakers with crown-style male plugs. In the first embodiment, the sockets comprise protruded holes dimensioned to mate with the crown-style male plugs.

Another object of the present invention is a low cost clip connector for making contact to the auxiliary signal terminals or the plug-in circuit breakers. Each clip is sized, shaped, and positioned to grasp a single auxiliary terminal whereas electrical connections to each clip are made by tracks on the substrate.

Still another object of the present invention is a low cost manufacturing method for fabricating the connector module.

In a preferred embodiment of the present invention, a DC modular distribution assembly is provided with one or more busbar modules for mechanically mounting and providing electrical connections to a corresponding number of overcurrent protection devices each having first and second male electrical plugs. Each assembly comprises a first support member having a mounting substrate with a first side and a second opposed side. The support member includes a plurality of first plug passageways disposed adjacent the mounting substrate. At least one conductive line busbar member is mounted to the support member and includes at least one first socket shaped and positioned to mate by a friction fit with a corresponding first male plug extending through a corresponding one of the first plug passageways. The support member also has at least one load busbar module installed thereon. Each load busbar module includes a conductive load busbar member and a second plug passageway, wherein the plug passageway is shaped to permit passage of a second electrical plug of each overcurrent protection device in a direction from a first side to a second side. Each conductive load busbar member includes a second socket shaped and positioned to mate by a friction fit with the second male plug extending through the second plug passageway. The support member and load busbar module are non-conductive so that the first male plugs of each overcurrent protection device and corresponding line busbar members are electrically insulated from the second male plugs and from each load busbar member.

One important technical advantage of the preferred embodiment is that it permits one to install only as many load busbar modules as needed for the particular system. Another advantage is that with such a modular design, an assembly of busbar modules, for accommodating a plurality of plug-in circuit breakers, may be readily assembled very quickly and easily, without the need for additional tools or hardware. The use of snap-in load busbar modules also avoids having to include the entire complement of busbars with each assembly.

These and other objects of the present invention will become apparent to those skilled in the art from the following detailed description and from the detailed drawings.

BRIEF DESCRIPTION OF THE DRAWINGS

FIG. 1 is a perspective view of a prior art circuit breaker module.

FIG. 2 is a side view of a prior art circuit breaker including an alarm circuit and stab-type current and alarm terminals.

FIG. 3A is a perspective view of a prior art circuit breaker module for mounting a plurality of circuit breakers with stab-type terminals.

FIG. 3B is a top view of the female connector surface of the circuit breaker module of FIG. 3A with the circuit breakers removed.

FIG. 4 is a perspective view of a prior art plug-in circuit breaker with plug-type male current connector terminals and plate-type alarm contact terminals.

FIG. 5 is a front perspective view of one embodiment of the circuit breaker module of the present invention.

FIG. 6 is a rear perspective view of the circuit breaker module of the present invention.

FIG. 7B is a front view of the housing of FIG. 7A.

FIG. 8 is rear view of the circuit breaker module of FIG. 5.

FIG. 9 is a cross-sectional view of the circuit breaker module of FIG. 8 along line 9—9.

FIG. 10 is a cross-sectional view of the circuit breaker module of FIG. 8 along line 10—10.

FIG. 11 is a cross-sectional view of the circuit breaker module of FIG. 8 along line 11—11.

FIG. 12 is a perspective view of a conductive busbar member of the present invention.

FIG. 13 is a top view of the busbar of FIG. 12.

FIG. 14 is a cross-sectional view of the busbar of FIG. 13 along line 14—14.

FIG. 15 is a side view of a conductive busbar member of the present invention.

FIG. 16 is a perspective view of a preferred embodiment of a conductive clip.

FIG. 17(a) shows a top view of the conductive clip of FIG. 16.

FIG. 17(b) shows a front view of the conductive clip of FIG. 16.

FIG. 17(c) shows a side view of the conductive clip of FIG. 16.

FIG. 18 is a rear view of the circuit breaker module of FIG. 6 showing in more detail conductive traces linking rows of conductive clips.

FIG. 19 is a detailed portion of the cross-section of FIG. 10.

FIG. 20 is a front view of a clip attached to a substrate showing an installed auxiliary signal terminal in phantom.

FIG. 21 is a cross section similar to FIG. 10 but showing a circuit breaker module adapted for circuit breakers having crown-style male plugs.

FIG. 22 is detailed portion of FIG. 21 showing in more detail a region around one plug and one alarm contact terminal of a circuit breaker about to be inserted into the circuit breaker module.

FIG. 23 is a front perspective view according to the preferred embodiment of the present invention where an assembly of circuit breaker connector modules is shown with one load busbar module attached thereto and with a partially exploded view of a plug-in circuit breaker, a printed circuit board substrate and a common line busbar.

FIG. 24 is a front perspective view of the assembly of connector modules of FIG. 23 partially assembled with busbar holders and a plug-in circuit breaker installed.

FIG. 25 is a front perspective view of the assembly of connector modules of FIG. 23 with circuit breakers and busbar holders attached thereto when fully assembled.

FIG. 26 is a side view of the assembly of connector modules of FIG. 25 taken along the cross-sectional line 26—26.

FIG. 27 is detailed front perspective view of the assembly of connector modules according to still another embodiment of the present invention, where one busbar holder and plug-in circuit breaker are installed.

FIG. 28 is a detailed rear perspective view of the assembly according to yet another embodiment of the present invention, with one plug-in circuit breaker attached thereto.

FIG. 29 is front perspective view of another embodiment of the present invention showing a portion of the assembly for receiving the auxiliary signal terminals of a plug-in fuse block and with a busbar holder installed.

FIG. 30 is a side view of the portion of the assembly of FIG. 29 taken along cross-sectional line 30—30.

DETAILED DESCRIPTION OF THE INVENTION

Figure 7A:
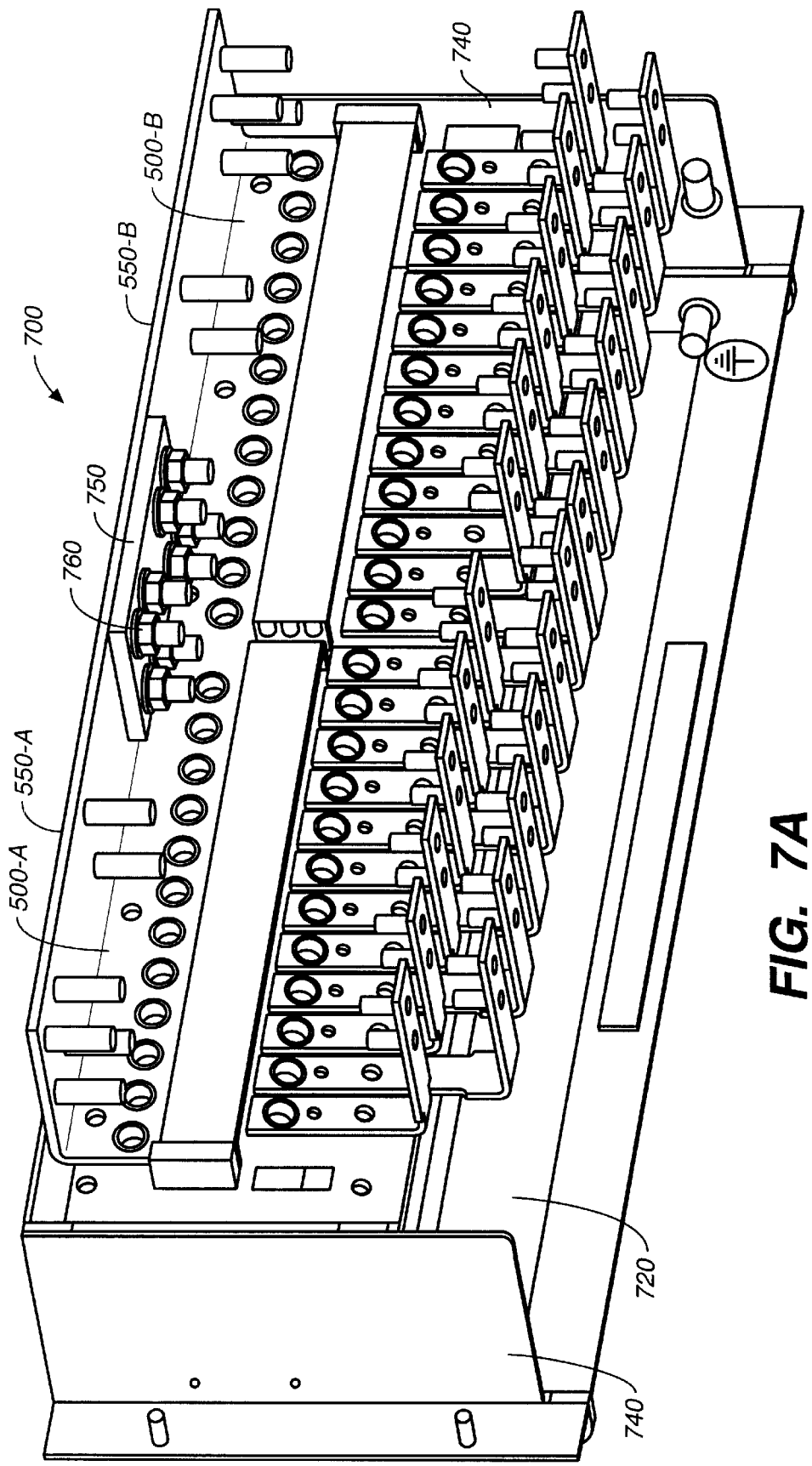
FIG. 7A shows a rear view of two circuit breaker modules of the present invention linked together in a housing.

A first embodiment of the present invention generally comprises a connector module as shown in FIGS. 5–17 for holding a plurality of overcurrent protection devices on a single mounting substrate, wherein each overcurrent protection device, e.g., circuit breaker, has male current plug connectors and male auxiliary signal terminals. In a preferred embodiment of the present invention as seen in FIGS. 23–28, an assembly of one or more modular load busbar modules may be coupled together to provide for the desired number of plug-in overcurrent protection devices needed for a particular application. Potential applications for the inventive modular assembly includes its use with fuse modules having auxiliary alarm signal terminals, and circuit breakers having auxiliary terminals used to perform a control function such as circuit breakers with auxiliary terminals used to receive remote control signals (e.g., signals to reset or turn-off the circuit breaker). In a preferred embodiment of the present invention, the combination of one or more fuse modules and circuit breakers each coupled to the connection modules of the modular distribution assembly: 1) permits additional fuse modules and circuit breakers to be coupled to a power distribution panel thereby being especially useful for telecommunications applications; 2) provides the benefit of safely insulated load and line bussing thereby minimizing the chance of deleterious short circuiting and hazardous user contact with live components; 3) minimizes system downtime during field upgrades and maintenance of components; 4) provides the benefit of automatically positioning fuse modules and circuit breakers in the assembly so that the user may remove or install such overcurrent protection devices easily, if necessary; 5) is well-suited for overcurrent protection devices mounted by plug-in or rail connection; and 6) reduces up-front manufacturing costs since only as many pre-fabricated components, such as load busbars, need to be used as required. FIGS. 29–30, as described in detail below, illustrate additional embodiments of a distribution assembly according to the present invention.

While the distribution assembly of the present invention is shown and described in detail as being used with plug-in circuit breakers having alarm contact terminals, it will be understood that the assembly of the present invention can be used with a variety of overcurrent protection devices and that plug-in circuit breakers are merely exemplary devices.

FIG. 5 is a front perspective view of one embodiment of a circuit breaker module 500 of the present invention showing one installed circuit breaker 400. Module 500 comprises a mounting substrate 510, which is preferably a printed circuit board substrate, patterned with two spaced apart male plug passageways 520, 525 and signal terminal passageways 530 for each circuit breaker 400. The passageways 520, 525, 530 may be fabricated using any conventional printed circuit board fabrication process. There is one signal terminal passageway 530 for each auxiliary signal terminal of the circuit breaker. Modem printed circuit board fabrication processes permit extremely accurate selection of the location, diameter, and spacing of passageways 520, 525, 530. Plug passageways 520, 525 and signal terminal passageways 530 are shaped, dimensioned, and spaced apart so that corresponding male plug connectors 410 and auxiliary signal terminals 420 (shown in FIG. 4) may be inserted into the passageways 520, 525, 530. Passageways 520, 525 are preferably at least one-tenth of an inch larger in diameter than plugs 410, since this enables the passageways to assist in aligning the plugs, i.e., the slightly larger diameter of the passageways 520, 525 compared with the plugs and sockets 570 (not shown in FIG. 5) assists the user aligning plugs 410 to the sockets 570 (shown in FIG. 6) disposed on the second side 512 of substrate 510. Generally, selecting the diameter of passageways 520, 525 to be several tenths (e.g., two or three) of an inch larger in diameter than plugs 410 provides an alignment benefit.

Module 500 has one conductive (load) busbar member 540 to couple load current from each circuit breaker 400. A conductive support 550 is configured to provide a common conductive (line) busbar member linking one terminal of each installed circuit breaker 400 to a common line current connection. Support 550 is a preferred design because support 550 may be used to mechanically couple module 500 to a housing (not shown in FIG. 5). However, the electrical function of support 550 could also be accomplished using a plurality of individual conductive busbar members (e.g., members similar to member 540) each individually coupled to a common line connection site. Additionally, in some applications it may be desirable to replace support 550 with a plurality of individual conductive busbar members (similar to member 540) which are not electrically coupled to each other. This may be useful, for example, in an application for which the circuit breakers are connected to different voltage sources so that both line and load power connections to the two plugs 410 of each circuit breaker are completely independent of each other.

Support 550 and members 540 are mechanically coupled to substrate 510 by mechanical connectors 560. Mechanical connectors 560 are preferably rivets, but may comprise any mechanical coupling device or fastener (e.g., epoxy) consistent with attaching support 550 and members 510 to substrate 510. Bolt hole connectors 590 permit support 550 to be bolted to a housing (not shown in FIG. 5) or attached to other elements.

As shown in FIG. 5, substrate 510 has a first side 514 and second side 512. First side 514 is preferably a bare insulating surface, i.e., has no conductive metal in regions adjacent circuit breakers 400 to prevent deleterious shorting of circuit breaker contact terminals 410, 420.

FIG. 6 is a rear perspective view of module 500. Conductive clips 600 are disposed adjacent signal terminal passageways 530 above second surface 512 of substrate 510. Members 540 and support 550 have sockets 570, 575 dimensioned to mate with the plug terminals 410 of a plug-in circuit breaker 400 extending through plug passageways 520, 525. FIG. 6 shows, at far right, a plug terminal 410 of one installed circuit breaker extending through a socket 570 in a member 540. As can be seen in FIG. 6, members 540 are spaced apart from one another, i.e., do not touch one another. Members 540 are preferably in the shape of L-shaped members with a portion of the L-shaped member extending perpendicular from second surface 512 of substrate 510.

Second surface 512 of substrate 510 is preferably a bare (insulating) surface adjacent each member 540 so that the members are electrically isolated from one another and from support 550. However electrical traces, sometimes known as "tracks" are preferably disposed on second surface 512 adjacent to, and electrically coupled to, clips 600 in order to provide transmission paths (not shown in FIG. 6) for alarm signals from clips 600 to a signal receiving portion (not shown in FIG. 6) of substrate 510.

As shown in FIG. 5, a preferred design is for a module 500 designed to accept twelve plug-in circuit breakers 400. Limiting the number of circuit breakers 400 that module 500 accepts reduces the weight and stress upon substrate 500. This is desirable in order to increase the reliability of module 500, i.e., to prevent substrate 510 from cracking or warping during extended use. However, a module for mounting a larger number of circuit breakers may be achieved by mechanically coupling a plurality of individual modules 500 together. FIG. 7A is a rear perspective view of two circuit breaker modules 500-A, 500-B coupled by a plate 750 and bolts 760 to form a combined circuit breaker module 700. Support 500-A and 500-B are shown joined by a plate 750 and bolts 760. However, more generally, any conventional mechanical coupler may be used to physically couple two or more circuit breaker modules 500 into a larger unit capable of holding a larger number of circuit breakers than a single module 500. FIG. 7B is a front view of the housing of FIG. 7A. As shown in FIG. 7B, preferably additional housing segments 730, 740 and a front plate 720 coupled by screws 710 are used to house and support the combined module 700.

FIG. 8 is a rear view of module 500. FIG. 9 is cross-sectional view along line 9—9 of FIG. 8 showing a side view of an installed plug-in circuit breaker 400. FIG. 10 is a cross-sectional view along line 10—10 of FIG. 8 showing how the male plugs 410 and alarm contact terminals 420 are disposed in their respective sockets 570 and clips 600. FIG. 11 is a cross-sectional view along line 11—11 of FIG. 8, showing how the alarm contact terminal 420 of a circuit breaker 400 is inserted into clip 600.

FIG. 12 is a detailed perspective view of member 540. Socket 570 may comprise any style of electrical socket shaped to mate with a friction fit to a plug 410. This includes sockets with detents and other conventional mating surfaces shaped to mate with a male connector. However, referring to FIG. 4, plug-in circuit breakers 400 are commonly sold with crown-style plugs 410 that are shaped to mate with a cylindrical hole of a predetermined length at what is commonly known as a connector "crown." Consequently, in a preferred embodiment socket 570 is substantially cylindrical in shape and with a diameter and length determined by the specific requirements of a crown-style plug 410. Generally, a crown-style plug 410 for common miniature plug-in circuit breakers requires a minimum socket length in order to achieve a proper mating of about 0.25 inches. Experiments by the inventors indicate that a protruded socket design, in which the average copper thickness is about one-eighth of an inch but which the protrusion has a cylindrical length of about one-quarter of an inch results in a substantial cost reduction. The member 540 shown in FIG. 12 is preferably formed with a protruded socket 570, since this results in about a factor of 3.5 lower manufacturing costs compared with manufacturing member 540 with a uniform thickness of copper and forming a cylindrical socket 570 by a drilling or reaming process. In a preferred manufacturing process, the protruded hole and all the cutting used to form member 540 are preferably performed on a dedicated progressive punch and die set. The ninety degree bend 1230 used to form the "L"-shape of members 540 is preferably made on a break press. Rivet holes 1210, 1220 permit member 540 to be riveted to substrate 510. FIG. 13 is a head-on view of member 540 showing preferred dimensions, in inches, for common plug-in circuit breakers. FIG. 14 is a cross-sectional view of socket 570 along line 14—14 of FIG. 13, showing preferred dimensions in inches. FIG. 15 is a side view of member 540 showing preferred dimensions in inches.

Clips 600 may be any type of clip which may be mounted on a mounting substrate (e.g., a printed circuit board) to form a female connector for auxiliary signal terminals and which has at least one contact region that supplies a sufficient pressure to maintain a reliable electrical connection to auxiliary signal terminals. A clip is commonly defined as a pinch-type connector in which a spring element acts to apply pressure to jaw or finger elements to form an electrical contact. In the art of printed circuit board fabrication, there are several structures that perform the function of providing contact surfaces that press upon a male shaft extended through a passageway in a printed circuit board. These structures are known by several names, including "integral electrical connectors" and "surface mountable socket connectors." Thus, clips 600 may alternately be described as a connector, or a socket connector, which includes spring contact elements. However, as used in this application the term "clip" describes the grasping function of clips 600 while avoiding potential confusion with the connector module 500 and with the male plug sockets 570.

Each individual clip 600 is preferably designed to minimize manufacturing costs. Studies by the inventors indicated that a plurality of clips 600 coupled by the conductive tracks of a printed circuit board results in over a five-fold reduction in cost of clip 600 compared with designing a large area connector socket to mate with the auxiliary contact terminals 420 of a large number of circuit breakers 400. In many applications it is desirable that each clip 600 has a contact pressure in the range of about 100 grams. A preferred clip design which achieves a contact pressure of about 100 grams is shown in FIGS. 16–17. As shown in the perspective view of FIG. 16, each clip 600 preferably has two finger segments 1610, 1620 dimensioned to mate with the surface of alarm contact terminals 420 with a significant contact pressure, e.g., about 100 grams. Finger segments 1610, 1620 are supported by legs 1630. Mounting feet 1640 are preferably structured to be inserted into substrate 510 and soldered into place. Legs 1630 and mounting feet 1640 are configured to provided a stable support for finger segments 1610, 1620. FIG. 17(*a*) shows a top view of clip 600 showing preferred dimensions in inches. FIG. 17(*b*) shows a front view of clip 600 showing preferred dimensions in inches. FIG. 17(*c*) shows a side view of clip 600 showing preferred dimensions in inches.

FIG. 18 is a rear view of module 500 showing clips 600 installed on the second surface 512 of substrate 510. Clips 600 are preferably soldered to conductive traces (also commonly known as "tracks") 1810 disposed on second surface 512. Traces 1810 may be formed by any conventional printed circuit board fabrication process. Traces 1810 are shown as electrically coupling rows of clip terminals together in a parallel arrangement (i.e., common terminals of each circuit breaker coupled together; normal-on signal terminals of each circuit breaker coupled together; and normal-off signal terminals of each circuit breaker coupled together). However, more generally traces 1810 may be configured to couple alarm signals from clips 600 in other ways, such as permitting an individual electrical connection to be made to each clip 600.

Some of the benefits of the present invention are illustrated in FIG. 19, which is detailed view of a portion of FIG. 10. As can be seen in FIG. 19, plugs 410 extend through plug passageways 1910 in substrate 510 and mate with sockets 570 in member 540 and support 550. Sockets 570 are preferably protruded holes shaped to provide a friction fit with plugs 410. The diameter and length of the protruded holes forming sockets 570 may be selected to obviate the need for additional mating surfaces. Generally, selecting the diameter of the sockets 570 to be only slightly larger than that of the plugs 410 facilitates forming a reliable mechanical and electrical connection. Additionally, the length of the protruded hole is another consideration. For circuit breakers 400 with crown-style plugs 410, the length of the protruded holes should be selected to mate with the crown of the plug.

The design of clips 600 facilitates reliable electrical connections to auxiliary contact terminals with relaxed placement tolerances. As can be seen in FIG. 19, auxiliary alarm contact terminals 420 extend through signal terminal passageways 1920. Alarm contact terminals 420 are grasped by fingers 1610, 1620 (finger 1610 shown in phantom) of clip 600 proximate a distal end of each alarm contact terminal 420. Referring to FIG. 20, which shows a front view of a clip 600 and an inserted alarm contact terminal 420 shown in phantom, it can be seen that the alarm contact terminal will make contact with fingers even though it may be displaced up or down by a distance ±Δ/2. Finger contacts 1610, 1620 are also insensitive to small lateral displacements of alarm contact terminal 420 in passageway 1920. Referring again to FIG. 19, when a user inserts plugs 410 into sockets 570 so that a friction fit is formed between male plugs 410 and sockets 570, finger contacts 1610, 1620 of each clip will automatically grasp alarm contacts 420 in spite of small vertical and lateral displacements of alarm contact terminals 420 caused by manufacturing tolerance of plugs 410 and sockets 570. Additionally, finger contacts 1610, 1620 are insensitive to small angular shifts caused by a slight (e.g., one degree) tilt of circuit breaker 400 caused by the force of gravity (shown in FIG. 19 by arrow 1990) producing a torque on the installed circuit breaker.

Referring to FIGS. 19–20, the present invention permits what is called "plug and play" installation or replacement of a circuit breaker. No additional clamps or bolts are required to install the circuit breaker. The sockets 570 may be dimensioned to permit installation or removal of the circuit breaker with a reasonable force, i.e., consistent with the hand strength of the average user and without overstressing substrate 510.

FIG. 21 shows a cross-sectional view, similar to that of FIG. 19, for a circuit breaker 400 having crown-style plugs 410, showing preferred dimensions in inches. Each crown-style plug has a metallic crown terminal section 2110, typically comprised of a layer of plated gold. In order to ensure a reliable electrical connection, each plug must be inserted into a cylindrical socket 570 beyond the center of the crown terminal (shown in phantom as line 2120). For one common style of crown-style plug, this distance, as measured from the base 2130 of the plug corresponds to a distance of 0.24 inches, as shown in FIG. 21. As can be seen in FIG. 21, the total thickness of substrate 510 through the protruded hole socket 570 corresponds to a length of about 0.290 inches, which results in proper mating of the crown-style plug 410. FIG. 22 is a detailed view of a portion of FIG. 21. As can be seen in FIG. 22, plug passageway 1910 is slightly larger in diameter than cylindrical socket 570, which facilitates mating. Also, alarm contact signal terminals 420 have a width less than that of passageways 1920 in order to facilitate their insertion.

It will be recognized that the connector module of the present invention may also be used with electronic devices which do not have auxiliary terminals, such as conventional plug-in fuses and circuit breakers without alarm terminals. It will also be recognized that sockets 570 may be shaped to mate with a variety of different shaped male connectors. It will also be recognized that while clips 600 are shown as being designed to mate with alarm contact terminals 420 having planar surfaces, more generally any male/female clip mating configuration may be used to accommodate changes in the shape of alarm contact terminals 420. Moreover, while circuit breakers 400 are currently commonly sold with male alarm contact terminals 420, it will be recognized that plug-in circuit breakers 400 with female alarm contact terminals 420, although less desirable, are technically possible. Connector module 500 may be adapted for use with plug-in circuit breakers 400 having female alarm contact terminals 420 by replacing clip 600 with any conventional male clip or socket which may be mounted to a mounting substrate to form a male/female connection with female alarm contact terminals.

The preferred embodiment of the present invention for accommodating one or more plug-in circuit breakers as part of a power distribution system is shown in FIG. 23. FIG. 23 shows a front perspective view of a DC modular distribution assembly 2300. Assembly 2300 includes two ten-position common conductive line busbar members 2310 coupled together, at least one load busbar module 2316, along with an exploded view of an uninstalled circuit breaker 400 and a printed circuit board substrate 2306. FIG. 24 depicts a perspective front view of the assembled connector module of the present invention showing one installed circuit breaker 400 and all of the load busbar modules installed.

Assembly 2300 includes a main structural support member 2302 which is manufactured from a non-conductive material, preferably a rigid and good electric and thermal insulator (e.g., extruded with a polymer resin). Support member 2302 provides an electrically insulating framework for the line and load busbar members mounted thereon. Support member 2302 includes a track member 2304 for slidably receiving and supporting printed circuit board substrate 2306. Support member 2302 also includes a track member 2305, as best seen in FIG. 24, for slidably receiving one or more line busbar members 2310. It will become readily apparent to those skilled in the art that by slidably receiving and supporting substrate 2306 and line busbar member 2310 on support member 2302, such components may be pre-manufactured separately and relatively inexpensively for final assembly of the assembly 2300 without the need for additional hardware upon assembly. This is desirable in order to decrease the complexity of pre-fabricated components used to form the connector module assembly.

Referring back to FIG. 23, support member 2302 is patterned with a plurality of male plug passageways 2308 spaced apart from each other and extending through a front portion 2303 of said support member 2302. A common conductive (line) busbar member 2310 is formed from a conductive strip composed of a malleable metal configured into a substantially rigid plate with contoured portions. Busbar member 2310 is dimensioned to be received by the track member 2305 of the support member 2302 as seen in FIG. 24 when the modular distribution assembly 2300 is assembled. Busbar member 2310 may be further fastened to the support member 2302 by conventional fastening means, if desired, including the use of mechanical connectors already discussed. Although FIGS. 23-25 depict the use of two line busbar members 2310 to accommodate up to a total of twenty circuit breakers, it will become readily apparent to those skilled in the art that this embodiment allows the use of different sized and shaped busbar members 2310 and different numbers of line busbar members 2310, as required.

Busbar member 2310 further includes a plurality of sockets 2312 each aligned with corresponding ones of the plug passageways 2308 in support member 2302 when busbar member 2310 is assembled in the support member 2302. Each of the sockets 2312 are shaped and positioned to mate and be in friction fit with a corresponding first male plug 410 (also known as a bullet plug) of a circuit breaker 400 that is caused to extend through a corresponding plug passageway 2308. As previously discussed, the busbar member 2310 functions to link a terminal of each installed circuit breaker 400 with a common line power connection, which may be fed thereto via a socket 2314, similar to that describing common (line) busbar member 550 of FIG. 5.

Printed circuit board substrate 2306 is slidably installed on said support member adjacent said front portion thereof and includes a plurality of electrical connectors 600 mounted thereon and connected to separate electrical traces formed on said substrate. In a structure analogous to the connection of alarm contact terminals 420 on circuit breaker 400 to respective clips 600, as seen in FIGS. 9 and 10 above, said electrical connectors are positioned on substrate 2306 so as to enable auxiliary signal terminals on said overcurrent protection devices to be coupled thereto when said overcurrent protection devices are mounted on said assembly. This connection provides a transmission path for electrical signals from said overcurrent protection devices to said electrical traces.

The assembly shown in FIG. 23 is also advantageous because it allows one to install only as many individual load busbar modules 2316 on support member 2302 as are needed. Each load busbar module 2316 is installed on the support member 2302, as shown in the perspective views of FIGS. 24-25, and as further described below. Included within each busbar module 2316 is a plug passageway 2320 shaped to permit passage of the other electrical plug 410 of a circuit breaker 400 therethrough. Each load busbar module 2316 further includes a housing 2317 and a conductive (load) busbar member 2318. Conductive load busbar member 2318 is used to couple load power from each circuit breaker 400 to a separate load power connection, much like the busbar members 540 of FIG. 5.

Each load busbar module 2316 is preferably snapped into place on the support member 2302. Both the load busbar module 2316 and support member 2302 include means for retaining the module 2316 in operative position relative to the support member 2302. Although a number of conventional ways may be used to couple a load busbar module 2316 to the support member 2302, a preferable manner includes the use of friction-fit clips 2222 formed along the exterior of busbar module 2316 and cooperating portions 2224 formed on the support member 2302. The clips 2222 and cooperating portions 2224 collectively form interengageable portions on both the busbar module 2316 and said support member 2302 so that the busbar module may be releasibly installed on the support member 2302.

A key benefit of this construction is the elimination of any need for additional hardware to assemble the busbar modules to support member 2302. This is shown more clearly in the side view of the circuit breaker module seen in FIG. 26, taken from the cross-sectional view along line 26—26 of FIG. 25. Accordingly, one may use as many individual load busbar modules, as necessary, without having to purchase all of the busbar modules 2318 ahead of time as part of a fixed assembly, as required with members 540 in the circuit breaker module shown in FIG. 5.

Each load busbar module 2316 housing 2317 and cooperating portions 2222 are manufactured from a non-conductive and thermally-insulating material, e.g., plastic casing, so as to isolate the electrical components contained therein from coming into contact with each other and for safety purposes so as to minimize any system downtime during field upgrades, servicing and maintenance. The design ensures that all the bussing (load and line) is completely insulated, thereby providing an important safety benefit to a person installing or maintaining the equipment.

Each load busbar module 2316 further includes a non-conductive cover 2226 for providing an additional safety feature in that it prevents fingers or other objects from passing into module 2316 to touch components conducting electricity, namely the conductive (load) busbar member 2318. Cover 2226 is also preferably pivotally connected to housing 2317 at one end thereof and manually releasably attached to housing 2303 at a second end to provide the benefit of enabling easy access to load busbar member 2318 for installation or servicing, or when busbar member 2318 requires testing. Although not shown, each busbar member 2318 is electrically coupled in a conventional manner to a corresponding socket 2228 which is dimensioned to mate with a plug 410 of a plug-in circuit breaker 400 that is caused to extend through plug passageway 2320.

When one or more load busbar modules 2316 are assembled on support member 2302, the male plug passageways 2308, 2320 are spaced apart from signal terminal passageways 530 for each circuit breaker 400. Passageways 2308, 2320 may be fabricated using any conventional process so long as it is essentially consistent with the requirements used to define passageways 520, 525, as previously described. As shown in FIGS. 23–25, an exemplary design is for assembly 2300 to accept up to twenty plug-in circuit breakers, where each ten circuit breakers share a common line bus member 2312. FIG. 25 depicts a perspective front view of the distribution assembly of the present invention showing all twenty installed circuit breakers 400 each with plugs 410 extending through plug passageways and engaging their respective sockets. One advantage of using the support member 2302 is that it is rigid and durable, thereby overcoming limitations on the number of circuit breakers used with module 500 of FIG. 5. The design permits the use of as many load busbar members 2318 as is required by the system in which assembly 2300 is installed.

The cooperating portions 2224 formed on support member 2302 provide a convenient way to support load busbar modules and plug-in circuit breakers having a variety of configurations. For example, in another embodiment of the present invention, a distribution assembly shown in the detailed perspective view of FIG. 27 also depicts, for clarity, one installed plug-in circuit breaker 400' although a plurality of circuit breakers are typically accommodated with such assemblies. Included in the embodiment of FIG. 27 is a busbar module 2716 that is modular and similar to module 2316 in that it includes friction-fit clips 2722 formed along its exterior for interengaging cooperating portions 2224 of support member 2302 in order to maintain busbar module 2716 in operative position. However, circuit breaker 400' further includes a pressure-loaded clip 2728 for engaging a recessed portion 2730 in load busbar module 2716 to thereby retain the circuit breaker 400' in operative position with busbar module 2716. Busbar module 2716 includes a plug passageway and socket (not shown) similar to plug passageway 2320 and socket 2228 shown in FIGS. 23–24.

While the above embodiments are especially useful for bullet plug-in circuit breakers, commonly used in North America, FIG. 28 shows a detailed rear perspective view of yet another embodiment of the present invention, wherein a distribution assembly has a support member 2302 with one exemplary plug-in circuit breaker or fuse 400" installed on the rear side of the support member. Additional such circuit breakers may be similarly installed on support member 2302. This alternative embodiment is particularly useful for DIN rail mounting devices frequently found in telecommunication applications within Europe. Circuit breaker 400" is coupled to the common line power connection via socket 2314 of common line bus member 2312. Support member 2302 may be configured in a variety of ways, but is preferably shown to include a first lip 2802 and a second lip 2804. Circuit breaker 400" includes a first cooperating edge portion 2806 and a second cooperating edge portion 2808 formed on the exterior thereof. First lip 2802 and second lip 2804 are preferably pressure-loadable and snap-fit to engage the respective first and second cooperating edge portions 2806, 2808. To electrically couple the circuit breaker 400" to the busbar member 2312, a male plug 410" is inserted through socket 2314. Much like socket 570, socket 2314 includes a patterned conductive strip composed of a malleable metal into a metal strip, which is then fastened to thereby form a protruded socket 2314 which will permit a friction fit with the male plug 410". Alternatively, a line power connection can be provided to circuit breaker 400" that does not have a plug 410", but rather has a terminal for use in connecting a cable or conductive strap thereto. A load power connection is provided to contact 2810 and thereby to circuit breaker 400". When the power passing through circuit breaker 400" via terminal 2810 exceeds a certain level, the circuit breaker 400" will trip, thereby ceasing current flow and preventing damage to the associated electrical equipment coupled thereto in the same manner as with other assembly embodiments described herein.

FIG. 29 shows a front perspective view of yet another embodiment of a portion of the assembly of the present invention with one exemplary plug-in circuit breaker installed. Additional circuit breakers may be similarly accommodated in this embodiment, in the same manner as described above. This embodiment is particularly useful for permitting rail mounting devices to be coupled to the support member. A circuit breaker 400''' is coupled to a load busbar module 2916 having conductive prongs 2918 for coupling load current to a load connection site (not shown). Busbar module 2916 includes portions 2920 formed from the non-conductive and thermally insulated material previously discussed to permit a user to grasp the holder. Although not shown, busbar module 2916 includes a plug passageway and socket, similar to plug passageway 2320 and socket 2228 shown in FIGS. 23–24, for electromechanically coupling the circuit breaker 400''' thereto. Busbar module 2916 further includes cooperating hook portions 2922, 2924, and a guide edge 2926 formed thereon. A portion 2930 of the support member includes rails 2928, 2932, which the hook portions 2922, 2924 slidably interengages, respectively, and as seen more clearly in the side view of FIG. 30. Portion 2930 of the support member further includes a lip portion 2934 along which guide edge 2926 pivots to dislodge hook portions 2922, 2924 from rails 2928, 2932 when mounting or dismounting busbar module 2916. Although not shown, a common conductive (line) busbar member is coupled to plug 410, similar to member 2310 discussed previously.

In summary, the present invention comprises a distribution assembly for over-current protection devices. The assembly addresses the need for a low-cost plug and play connector module for plug-in circuit breakers having male line and load current plugs and additional auxiliary signal terminals. The use of a printed circuit board as a support substrate for busbars and alarm contact clips results in a low manufacturing cost. Contacts to auxiliary alarm contact terminals are made using a plurality of clips mounted to the substrate, wherein tracks on the printed circuit board substrate are used to make electrical contact to the clips. When a variable number of over-current protection devices are required to be connected to a distribution panel, the present invention also provides an improved way of constructing a modular assembly of load busbar modules. Using premanufactured components designed to be coupled together in a modular fashion permits the "plug and play" convenience during assembly. the availability of fuse blocks provides additional fuse circuits, as needed, to enhance the flexibility of assemblies according to the present invention. Compared with conventional assemblies, the distribution assembly of the present invention affords an ergonomic alternative to constructing, maintaining and servicing power distribution systems.

Although preferred and alternative embodiments of the present invention and modifications thereof have been described in detail herein, it is to be understood that this invention is not limited to those precise embodiments and modifications, and that other modifications and variations may be affected by one of ordinary skill in the art without departing from the spirit and scope of the invention as defined in the appended claims.

What is claimed is:

1. An assembly for mechanically mounting and providing electrical connections to a plurality of overcurrent protection devices each having first and second male electrical plugs, comprising:

a support member formed of non-conducting material and having a front portion, said support member including a plurality of spaced apart first plug passageways formed in said front portion;

at least one conductive line busbar member mounted on said support member and having at least one first socket shaped and positioned to mate by a friction fit with a corresponding first male plug extending through a corresponding one of said first plug passageways;

at least one load busbar module including a non-conductive housing having a second plug passageway formed therein, and a conductive load busbar member, wherein said support member includes means for retaining said load busbar module in an operative position relative thereto, said conductive load busbar member having a second socket shaped and positioned to mate by a friction fit with a corresponding second male plug extending through said second plug passageway and;

a printed circuit board substrate slidably installed on said support member adjacent said front portion thereof and including a plurality of electrical connectors mounted thereon and having separate electrical traces formed on said substrate connected thereto, said electrical connectors positioned so as to enable auxiliary signal terminals on said overcurrent protection devices to be coupled thereto when said overcurrent protection devices are mounted on said assembly, to provide a transmission path for electrical signals from said overcurrent protection devices to said electrical traces;

wherein respective said first and second plug passageways are shaped and spaced apart from each other to permit passage of the electrical plugs of each said overcurrent device through said passageways so as to mate with corresponding said first and second sockets.

2. An assembly of claim 1, wherein said conductive line busbar member further comprises at least one third socket shaped and positioned to enable coupling of said conductive line busbar member to a common line power connection.

3. An assembly of claim 1, wherein the overcurrent protection devices are selected from a group consisting of a circuit breaker and a fuse module.

4. An assembly of claim 1, wherein said load busbar module further comprises a non-conductive cover pivotally attached at one end of said housing and releasably attached at a second end for preventing contact with said load busbar members when said cover is closed.

5. An assembly of claim 1, wherein the overcurrent protection devices comprise plug-in circuit breakers with crown-style male plugs and the sockets in said line and load busbar members are cylindrical.

6. An assembly of claim 1, wherein said load busbar module comprises a recessed portion, and each of said overcurrent protection devices includes a pressure-loaded clip for engaging the recessed portion to thereby retain the circuit breaker in operative position with said load busbar module.

7. An assembly of claim 1, wherein said at least one load busbar module further comprises cooperating hook portions and a guide edge formed thereon, said support member further including one or more rails for slidably interengaging the hook portions and a lip portion along which said guide edge pivots to mount or dismount the load busbar module.

8. An assembly of claim 1, wherein said means for retaining said load busbar module in operative position relative to said support member comprises interengageable portions formed on said holder and said support member.

9. An assembly of claim 8, wherein said interengageable portions include friction-fit clips formed along the exterior of said load busbar module and cooperating portions formed on said support member.

10. An assembly of claim 1, wherein said support member comprises a pair of lip portions extending outwardly from the front portion of said support member, said overcurrent protection devices including a pair of cooperating edge portions formed on the exterior thereof, said lip portions frictionally engaging said pair of cooperating edge portions when said overcurrent protection devices are coupled to said support member.

11. An assembly of claim 10, wherein said lip portions are pressure-loaded and snap-fit to engage the cooperating edge portions, each of said male electrical plugs being passed through a corresponding one of said first and second sockets.

12. An assembly for mechanically mounting and providing electrical connections to a plurality of overcurrent protection devices each having first and second male electrical plugs, comprising:

a support member formed of non-conducting material and having a front portion, said support member including a plurality of spaced apart first plug passageways formed in said front portion;

at least one conductive line busbar member mounted on said support member and having at least one first socket shaped and positioned to mate by a friction fit with a corresponding first male plug extending through a corresponding one of said first plug passageways;

at least one load busbar module including a non-conductive housing having a second plug passageway formed therein, and a conductive load busbar member, wherein said support member includes means for retaining said load busbar module in an operative position relative thereto, said conductive load busbar member having a second socket shaped and positioned to mate by a friction fit with a corresponding second male plug extending through said second plug passageway, wherein respective said first and second plug passageways are shaped and spaced apart from each other to permit passage of the electrical plugs of each said overcurrent device through said passageways so as to mate with corresponding said first and second sockets;

a mounting substrate having a first side and a second opposed side slidably mounted to the front portion of said support member;

a signal terminal passageway disposed in said substrate for each overcurrent protection device, each said signal terminal passageway extending from said first side to said second side and shaped and positioned to permit the passage therethrough of a male auxiliary signal terminal of a corresponding overcurrent protection device from said first side to said second side;

a conductive clip for each signal terminal passageway, said clips mounted to the second side of the substrate adjacent the passageway and having contact surfaces shaped and positioned to make electrical contact with the auxiliary signal terminals; and at least one electrical trace disposed on one of said surfaces of the substrate and electrically coupled to said clips to form at least one transmission path for electrical signals.

13. An assembly of claim 12, wherein the overcurrent protection devices each comprise a circuit breaker, said male electrical plugs comprise crown-style male plugs and the sockets are cylindrical.

14. An assembly of claim 12, wherein the overcurrent protection devices are selected from the group consisting of circuit breakers, fuses and fuse modules.

15. A method of fabricating an assembly for mechanically mounting and providing electrical connections to a plurality of circuit breakers each having two male current plugs and an alarm contact terminal, said method comprising the steps of:

a) providing a support member for supporting a printed circuit board substrate having a first side and a second side and patterning first plug passageways in said support member;

b) providing at least one line busbar member having first sockets substantially aligned with the first plug passageways and shaped and dimensioned to mate with the plugs with a friction fit;

c) providing a plurality of load busbar modules and patterning a second plug passageway in each said load busbar module;

d) patterning a conductive strip composed of a malleable metal into a metal strip;

e) forming a plurality of second sockets in the conductive strip, said second sockets protruding from said strip and being shaped and dimensioned to mate with the plugs with a friction fit;

f) fastening the conductive strip to said load busbar module so that the second sockets are aligned with corresponding ones of the second plug passageways;

g) coupling each said load busbar module to said support member such that the second plug passageways of said load busbar modules are each aligned with a corresponding one of said first plug passageways so as to enable the plugs of a circuit breaker to pass therethrough and mate with said first and second sockets;

h) patterning a plurality of alarm contact terminal passageways extending from said first side to said second side, said terminal passageways being shaped to permit the passage therethrough of the alarm contact terminal of each of the circuit breakers;

i) providing a plurality of connector clips;

j) forming a conductive trace on one of said sides of the printed circuit board;

k) mounting one clip above each alarm contact terminal passageway; and l) forming a conductive connection to each clip and the conductive trace so that an electrical connection is made to each clip.

16. The method of claim 15, wherein each of said clips has first and second finger segments shaped to receive male prongs extending from the alarm contact terminal of each of said circuit breakers, the clips having conductive support legs shaped and dimensioned so that the clips may be mounted to the substrate with the finger segments disposed above a surface of the substrate.

\* \* \* \* \*